(12) United States Patent
Rochester et al.

(10) Patent No.: US 7,717,441 B2
(45) Date of Patent: May 18, 2010

(54) SUSPENSION MOUNTING CROSSMEMBER WITH INTEGRATED CAB MOUNTS FOR VEHICLE HAVING FRONT MULTILINK SUSPENSION

(75) Inventors: Ryan S. Rochester, Fort Wayne, IN (US); John D. Fehring, Churubusco, IN (US); James H. Merriman, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 278 days.

(21) Appl. No.: 11/952,751

(22) Filed: Dec. 7, 2007

(65) Prior Publication Data

US 2008/0211265 A1    Sep. 4, 2008

(51) Int. Cl.
*B60G 7/02* (2006.01)
(52) U.S. Cl. .............................................. 280/124.109
(58) Field of Classification Search .......... 280/124.109, 280/785, 788, 795, 800; 180/311, 312, 299
See application file for complete search history.

(56) References Cited

U.S. PATENT DOCUMENTS

| | | | |
|---|---|---|---|
| 5,385,369 A | 1/1995 | Mukai et al. | |
| 5,641,181 A * | 6/1997 | Galhotra | 280/795 |
| 6,120,060 A | 9/2000 | Kocer et al. | |
| 6,398,262 B1 * | 6/2002 | Ziech et al. | 280/785 |
| 6,409,216 B2 * | 6/2002 | Suzuki | 280/781 |
| 6,494,472 B2 * | 12/2002 | Suzuki | 280/124.109 |
| 6,564,892 B2 * | 5/2003 | Wooldridge et al. | 180/68.4 |
| 6,733,021 B1 * | 5/2004 | Ziech et al. | 280/124.109 |
| 7,516,968 B2 * | 4/2009 | Cortez et al. | 280/124.116 |
| 2002/0113394 A1 * | 8/2002 | Ziech et al. | 280/124.109 |

* cited by examiner

*Primary Examiner*—Faye M. Fleming
(74) *Attorney, Agent, or Firm*—Jeffrey P. Calfa; Mark C. Bach; Gerald W. Askew

(57) ABSTRACT

A three piece belly-band crossmember is provided which may be installed as a single assembly and from which the center subassembly may be removed after installation, allowing access to the vehicle powertrain. The crossmember maintains integral strength as a result of a tab and slot arrangement and overlapping frame mounting holes between its three subassemblies. It may be provided with a suspension component mounting point. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

22 Claims, 20 Drawing Sheets

BELLY-BAND CROSSMEMBER ASSEMBLY WITH SUSPENSION MOUNTING POINT AND CAB MOUNTING POINTS

FIG. 1 BELLY-BAND CROSSMEMBER ASSEMBLY WITH SUSPENSION MOUNTING POINT AND CAB MOUNTING POINTS

BELLY-BAND
CROSSMEMBER ASSEMBLY
WITH SUSPENSION MOUNTING
POINT AND CAB MOUNTING
POINTS

BELLY-BAND
CROSSMEMBER ASSEMBLY
WITH SUSPENSION MOUNTING
POINT AND CAB MOUNTING POINTS

BELLY-BAND
CROSSMEMBER ASSEMBLY
WITH SUSPENSION MOUNTING
POINT AND CAB MOUNTING POINTS

BELLY-BAND
CROSSMEMBER ASSEMBLY
WITH SUSPENSION MOUNTING
POINT AND CAB MOUNTING POINTS

BELLY-BAND CROSSMEMBER ASSEMBLY HAVING SUSPENSION MOUNTING POINT AND CAB MOUNTING POINTS

BELLY-BAND
CROSSMEMBER ASSEMBLY
WITH SUSPENSION MOUNTING
POINT AND CAB MOUNTING POINTS

LEFT HAND ISO VIEW
OF BELLY-BAND CROSSMEMBER
ASSEMBLY INCORPORATING
SUSPENSION MOUNTING POINT
AND CAB MOUNTING POINTS

RIGHT HAND ISO VIEW
OF BELLY-BAND CROSSMEMBER
ASSEMBLY INCORPORATING
SUSPENSION MOUNTING POINT
AND CAB MOUNTING POINTS

FRONT VIEW OF
BELLY-BAND CROSSMEMBER
ASSEMBLY INCORPORATING
SUSPENSION MOUNTING POINT
AND CAB MOUNTING POINTS

REAR VIEW OF
BELLY-BAND CROSSMEMBER
ASSEMBLY INCORPORATING
SUSPENSION MOUNTING POINT
AND CAB MOUNTING POINTS

LEFT HAND SIDE VIEW OF BELLY-BAND CROSSMEMBER ASSEMBLY INCORPORATING SUSPENSION MOUNTING POINT AND CAB MOUNTING POINTS

RIGHT HAND SIDE VIEW OF BELL-BAND CROSSMEMBER ASSEMBLY INCORPORATING SUSPENSION MOUNTING POINT AND CAB MOUNTING POINTS

TOP VIEW OF BELLY-BAND CROSSMEMBER ASSEMBLY INCORPORATING SUSPENSION MOUNTING POINT AND CAB MOUNTING POINTS

BOTTOM VIEW OF BELLY-BAND CROSSMEMBER ASSEMBLY INCORPORATING SUSPENSION MOUNTING POINT AND CAB MOUNTING POINTS

LEFT HAND LOWER
ISO VIEW OF BELLY-BAND
CROSSMEMBER AND VEHICLE
FRONT SUSPENSION

RIGHT HAND LOWER ISO VIEW OF BELLY-BAND CROSSMEMBER ASSEMBLY WITH SUSPENSION COMPONENT REMOVED

RIGHT HAND LOWER
ISO VIEW OF BELLY-BAND
CROSSMEMBER ASSEMBLY
WITH FASTENERS REMOVED

LEFT HAND SIDE VIEW
OF BELLY-BAND CROSSMEMBER
WITH FASTENERS REMOVED

LEFT HAND ISO VIEW
CENTER PORTION OF BELLY-BAND
CROSSMEMBER ASSEMBLY
BEING REMOVED FROM ASSEMBLY

SUSPENSION MOUNTING CROSSMEMBER WITH INTEGRATED CAB MOUNTS FOR VEHICLE HAVING FRONT MULTILINK SUSPENSION

FIELD OF THE INVENTION

This invention relates to a crossmember assembly in a vehicle frame that has several functions, including but not limited to providing structure to the vehicle frame, providing a mounting point for the vehicle suspension, and providing mounting points for the vehicle cab. The crossmember is constructed in such a way that it may be installed as a single assembly during construction of the vehicle. If at a later time it is desired that the lower portion of the crossmember be removed in order to access major vehicle components, several pre-installed bolts may be removed, and several frangible tack-welds may be broken, allowing the lower portion to be removed while leaving the upper cab mount portions in place, such that it does not become necessary to remove the vehicle cab.

BACKGROUND

Vehicles for operation on the ground, particularly trucks and heavy vehicles, are commonly provided with a structural frame to which the body, powertrain, and running gear are mounted. This structural frame often comprises a set of frame rails that are connected by several crossmembers to form a ladder-type vehicle frame. Two or more axles are attached to suspension assemblies, which are in turn attached to various mounting points on this vehicle frame. An engine and transmission, together comprising the vehicle powertrain, are mounted between the rails upon elastic mounts, typically towards the front of the vehicle. A vehicle cab is also attached to the vehicle frame, often by means of elastic mounts. For each of the suspension mounting points, cab mounts, and engine and transmission mounts, suitable brackets must be used to attach the mounts to the frame.

Because of the location of the engine and transmission, and because the structural frame must bear the loads generated by the front suspension, the weight of the engine and transmission, and often the vehicle cab in the same area, one or more special crossmembers are used to tie the frame rails together while providing clearance for the engine and transmission. These special crossmembers are sometimes referred to as horse-collars or belly-bands.

It is advantageous to maximize the functionality of each subcomponent of a vehicle frame, in order to minimize weight and costs associated with manufacturing. Accordingly, it would be advantageous to use the belly-band crossmember for such purposes as providing a mounting point for suspension components or vehicle cab mounts. It is also advantageous to accommodate serviceability in the design of the vehicle, by making it possible to remove certain components without requiring extensive disassembly of the completed vehicle.

SUMMARY OF THE INVENTION

A belly-band type crossmember assembly is provided incorporating a suspension mounting point and two front cab mounting points. The assembly is made from three manufactured sub-assemblies, the three manufactured sub-assemblies being a center portion and two end portions. The belly-band crossmember assembly is asymmetric, therefore one of the two end portions will be referred to as the left hand or first end portion of the belly-band crossmember assembly, and the other of the two end portions will be referred to as the right hand or second end portion of the belly-band crossmember assembly. It will be appreciated, however, that the entire assembly may be symmetrically opposite while still being within the scope of the invention.

The right hand or second end portion of the belly-band crossmember assembly is oriented generally vertically, and extends upwards from the point where it attaches to the vehicle frame to a point where it provides support for the vehicle cab right hand mount. The right hand or second end portion of the belly-band crossmember assembly also extends downwards from the point where it attaches to the vehicle frame to a point where it connects to the center portion of the belly-band crossmember assembly. The right hand or second end portion of the belly-band crossmember assembly is generally C-shaped in cross-section, opening outwards from the vehicle frame, except at the upper end, at which point it forms a closed section to receive the vehicle cab right hand mount. The right hand or second end portion of the belly-band crossmember assembly has flanges that extend inwardly at the lower end, in order to engage the center portion of the belly-band crossmember assembly.

The left hand or first end portion of the belly-band crossmember assembly is again oriented generally vertically, extending upwards from the point where it attaches to the vehicle frame to a point where it provides support for the vehicle cab left hand mount. Unlike the right hand or second end portion of the belly-band crossmember assembly, the left hand or first end portion of the belly-band crossmember assembly does not extend significantly downwards from the point where it attaches to the vehicle frame. Instead, the center portion of the belly-band crossmember assembly extends upward in order to connect to it, as will be subsequently described. The left hand or first end portion of the belly-band crossmember assembly is generally C-shaped in cross-section, similar to the right hand or second end portion of the belly-band crossmember assembly. It also opens outwards from the vehicle frame, except at the upper end, at which point it also forms a closed section to receive the vehicle cab left hand mount.

The center portion of the belly-band crossmember assembly extends generally horizontally from the point where it engages the right hand or second end portion of the belly-band crossmember assembly, and crosses beneath the vehicle frame. The center portion of the belly-band crossmember assembly then extends vertically to connect to the left hand or first end portion of the belly-band crossmember assembly. The center portion of the belly-band crossmember assembly may be provided with an angled transition section between its horizontal section and its vertical section, depending upon the need to clear other vehicle components. The center portion of the belly-band crossmember assembly is generally C-shaped in cross-section, opening downwards and outwards from the vehicle frame. At or near the point where it engages the right hand or second end portion of the belly-band crossmember assembly, the center portion of the belly-band crossmember assembly incorporates a suspension mounting point, preferably a mounting point for a Panhard rod.

The right hand or second end portion, the left hand or first end portion, and the center portion of the belly-band crossmember assembly may alternately have cross-sections other than C-shaped. The right hand or second end portion, the left hand or first end portion, and the center portion of the belly-band crossmember assembly may also incorporate mounting points for other suspension, powertrain, body, or miscellaneous vehicle components at various locations.

At the point where the center portion of the belly-band crossmember assembly engages the right hand or second end portion of the belly-band crossmember assembly, several conventional fasteners are used to releasably secure the two portions together. In order to help the conventional fasteners withstand the forces generated by the Panhard rod, the center portion of the belly-band crossmember assembly is provided with a tab, which tab fits into a slot provided in the right hand or second end portion of the belly-band crossmember assembly. In this way, the tab and slot provide redundant lateral strength to the belly-band crossmember assembly.

At the point where the center portion of the belly-band crossmember assembly engages the left hand or first end portion of the belly-band crossmember assembly, only several frangible tack-welds are used to secure the two portions together until installation. However, several holes in the center portion of the belly-band crossmember assembly overlap several holes in the left hand or first end portion of the belly-band crossmember assembly. These holes are the lower several of a larger pattern of holes that are used in conjunction with conventional fasteners to attach the belly-band crossmember assembly to the vehicle frame. Once the conventional fasteners are used to attach the belly-band crossmember assembly to the vehicle frame, the frangible welds securing the center portion and the left hand or first end portion of the belly-band crossmember assembly together become redundant and unnecessary to the strength of the assembly.

When the belly-band crossmember assembly is to be installed on the vehicle frame, the three portions of the assembly are already assembled. The center portion of the belly-band crossmember assembly and the right hand or second end portion of the belly-band crossmember assembly are secured together by conventional fasteners, as noted previously, and the center portion of the belly-band crossmember assembly and the left hand or first end portion of the belly-band crossmember assembly are secured together by only several frangible tack-welds, as noted previously. The belly-band crossmember assembly is attached to the vehicle frame using conventional fasteners. Thereafter, the Panhard rod is attached to its mounting point on the center portion of the belly-band crossmember assembly, and the vehicle cab mounts are attached to their mounting points on the left hand or first end portion and right hand or second end portion of the belly-band crossmember assembly, though not necessarily in the sequence set forth. Other suspension, powertrain, or body mount attachments may be attached at this time as well.

If it becomes necessary to remove the center portion of the belly-band crossmember in order to access, remove, or service a vehicle component, it is possible to do so without removing the vehicle cab mounts, and therefore without removing or detaching the vehicle cab, to great advantage. In order to do so, first the Panhard rod or other suspension components are removed from their attachment points to the belly-band crossmember assembly. Then the conventional fasteners securing the center portion and the right hand or second end portion of the belly-band crossmember together are removed. Next, the lower several of the conventional fasteners attaching the belly-band crossmember assembly to the vehicle frame on the left hand side are removed. The upper conventional fasteners of the mounting pattern remain in place, allowing the left hand or first end portion of the belly-band crossmember to remain in place, and therefore eliminating the necessity of detaching or removing the vehicle cab.

Next, the center portion of the belly-band crossmember assembly is forcibly pulled downwards, disengaging the tab on the center portion from the slot on the right hand or second end portion of the belly-band crossmember assembly. The center portion of the belly-band crossmember is then forced further downwards, hinging about the frangible tack-welds attaching it to the left hand or first end portion of the belly-band crossmember assembly. It may then be worked back and forth until cold-working causes the frangible tack-welds to break. If necessary, minor grinding or cutting of the welds may be utilized to encourage them to break. Except for the tack-welds, re-installation of the center portion of the belly-band crossmember is simply the reverse of the removal process.

DETAILED DESCRIPTION OF THE INVENTION

Figure 1:
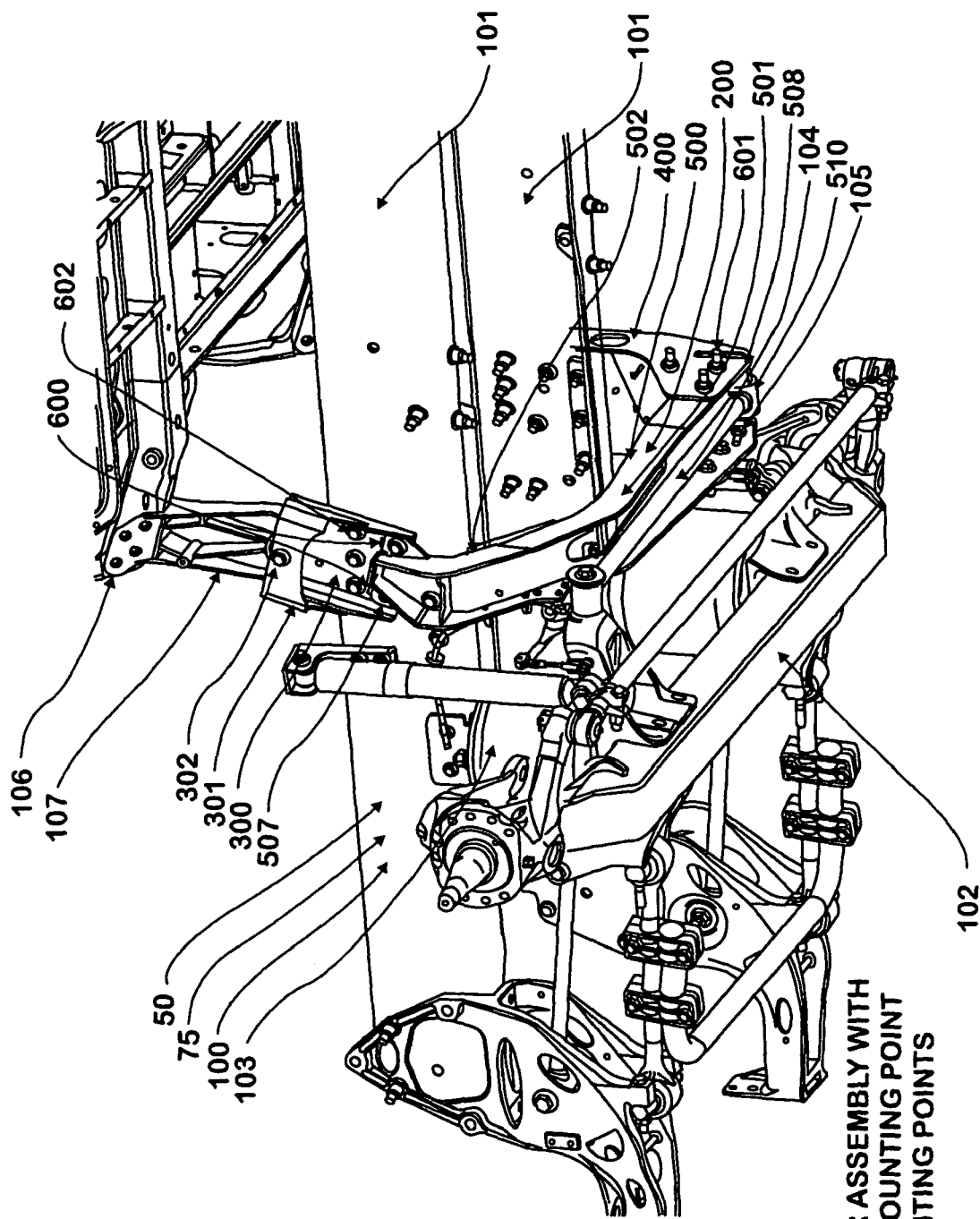
FIG. 1—A left hand lower isometric view of an embodiment of the invention.

FIG. 1 shows a vehicle 50 having a chassis 75 having a ladder-type vehicle frame 100 with frame side-members 101. The chassis 75 is provided with an axle 102 and a suspension 103, which suspension 103 is provided with, among other links and control rods, a Panhard rod 104. The frame side-members 101 of the vehicle frame 100 are spaced apart and held in a parallel configuration by crossmembers, one of which is an embodiment of the instant invention, a belly-band crossmember assembly 200. The belly-band crossmember assembly 200 is provided with a first end subassembly 300, a second end subassembly 400, and a center subassembly 500. The first end subassembly 300 has a first end subassembly upwards extending section 301 that terminates in a first end subassembly cab mounting point 302. Similarly, the second end subassembly 400 has a second end subassembly upwards extending section 401 (not visible) that also terminates in a second end subassembly cab mounting point 403 (not visible). The first end subassembly cab mounting point 302 and second end subassembly cab mounting point 403 (not visible) provide support for a cab 106 through cab mounts 107. The center subassembly 500 has a center subassembly generally horizontal section 501 and a center subassembly generally upwards extending section 502, and engages with the first end subassembly 300 at the point of engagement 507 and with the second end subassembly 400 at the point of engagement 508. Prior to installation, the center subassembly 500 is attached to the first end subassembly 300 by frangible tack-welds 600, and the center subassembly 500 is attached to the second end subassembly 400 by pre-installed fasteners 601. The center subassembly 500 has a suspension mounting point 510, to which the Panhard rod 104 is attached using Panhard rod mounting bolts 105. The belly-band crossmember assembly 200 is attached to the ladder-type vehicle frame 100 using belly-band crossmember assembly frame mounting fasteners 602.

Figure 2:
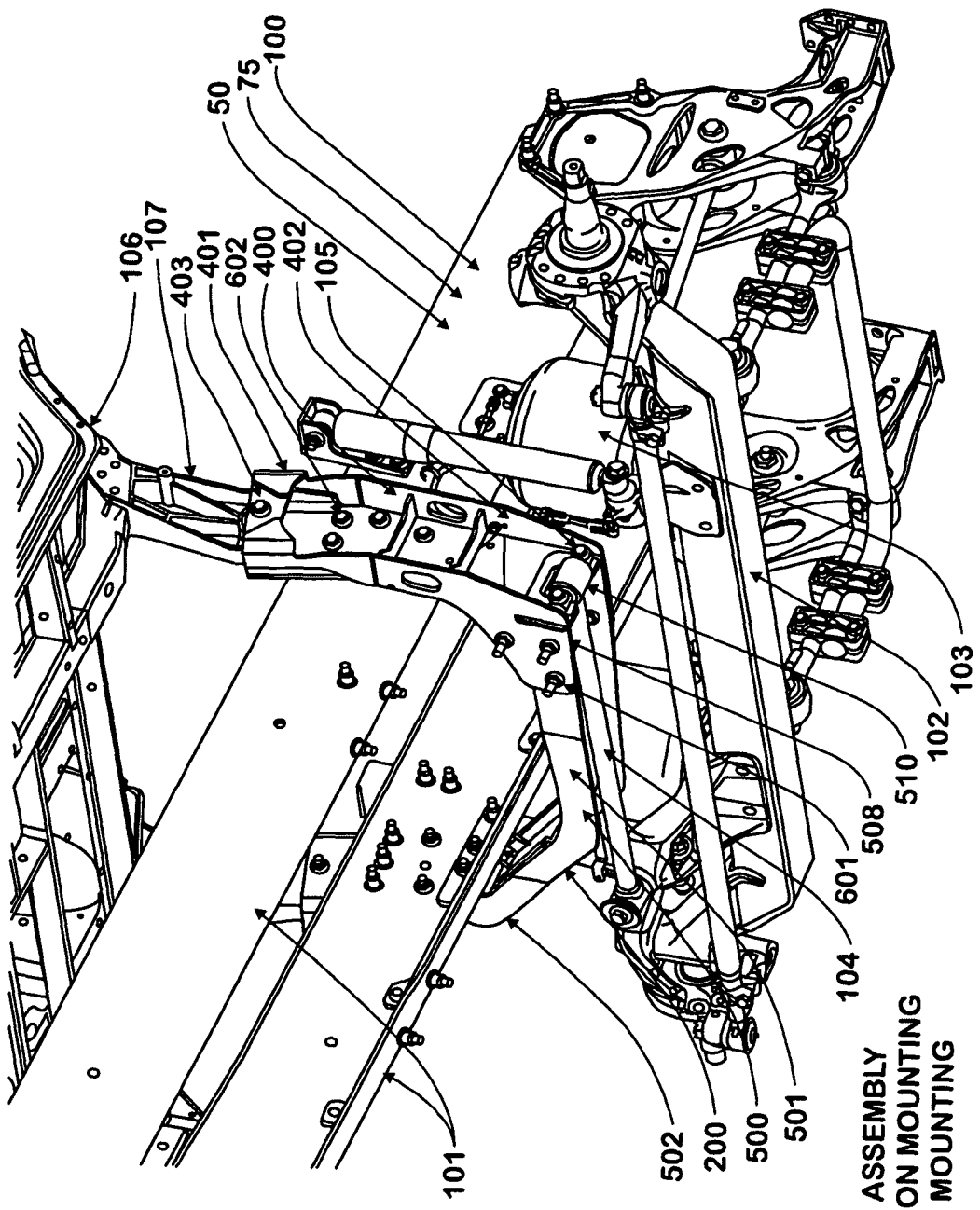
FIG. 2—A right hand lower isometric view of an embodiment of the invention.

FIG. 2 again shows a vehicle 50 having a chassis 75 with ladder-type vehicle frame 100 with frame side-members 101, as well as an axle 102, a suspension 103 with a Panhard rod 104, a cab 106 supported by cab mounts 107, and an embodiment of the belly-band crossmember assembly 200. The belly-band crossmember assembly 200 is again provided with a first end subassembly 300 (not visible) having a first end subassembly upwards extending section 301 (not visible) that terminates in a first end subassembly cab mounting point 302 (not visible), a second end subassembly 400 having a second end subassembly upwards extending section 401 that terminates in a second end subassembly cab mounting point 403, and a center subassembly 500 having a center subassembly horizontal section 501 and a center subassembly upwards extending section 502. The first end subassembly cab mounting point 302 (not visible) and second end subassembly cab mounting point 403 provide support for the cab 106 through cab mounts 107. The center subassembly 500 engages the first end subassembly 300 (not visible) at the point of engagement 507 (not visible), and engages the second end subassembly 400 at the point of engagement 508. The center subassembly 500 is provided with a suspension mounting point 510, to which the Panhard rod 104 of the suspension 103 is attached using Panhard rod mounting bolts 105. Prior to installation, the center subassembly 500 is attached to the first end subassembly 300 (not visible) by frangible tack-welds 600 (not visible), and the to the second end subassembly 400 by pre-installed fasteners 601. The belly-band crossmember assembly 200 is attached to the ladder-type vehicle frame 100 using belly-band crossmember assembly frame mounting fasteners 602.

Figure 3:
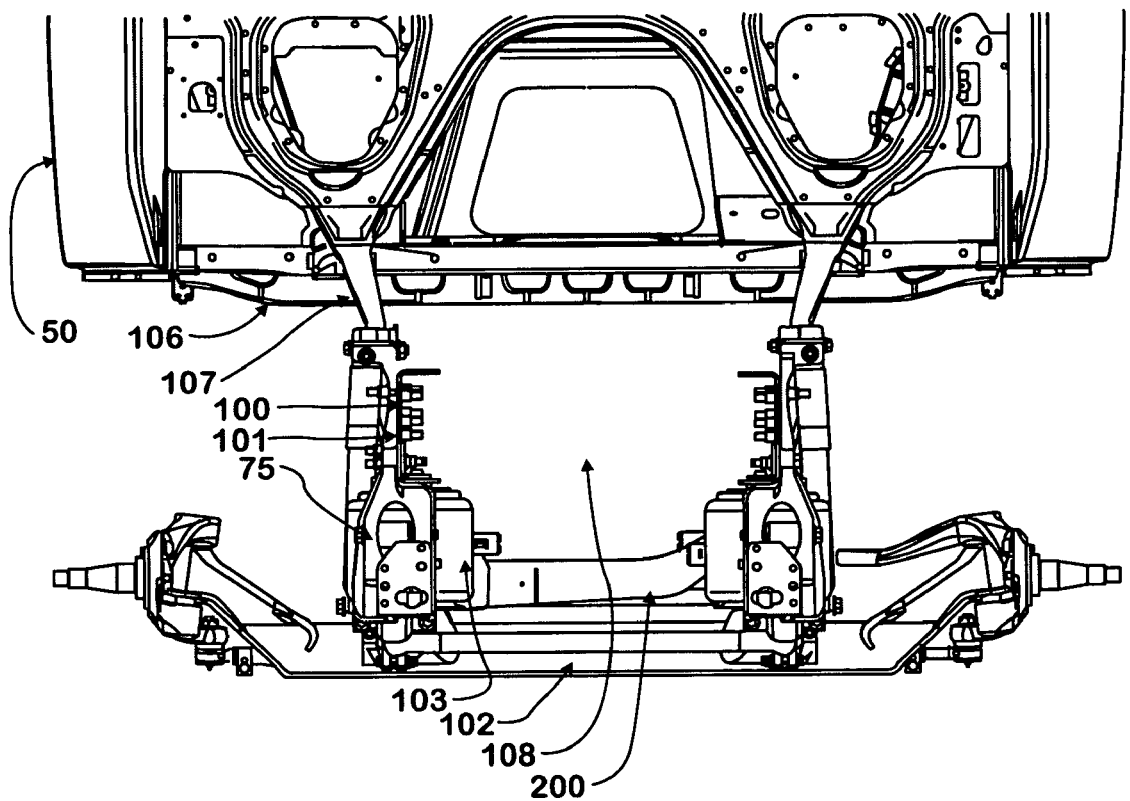
FIG. 3—A front view of an embodiment of the invention.

FIG. 3 again shows a vehicle 50 having a chassis 75 with ladder-type vehicle frame 100 with frame side-members 101, as well as an axle 102, a suspension 103, a cab 106 supported by cab mounts 107, and an embodiment of the belly-band crossmember assembly 200. FIG. 3 illustrates the space for the vehicle powertrain 108, which the belly-band crossmember assembly 200 is made to accommodate.

Figure 4:
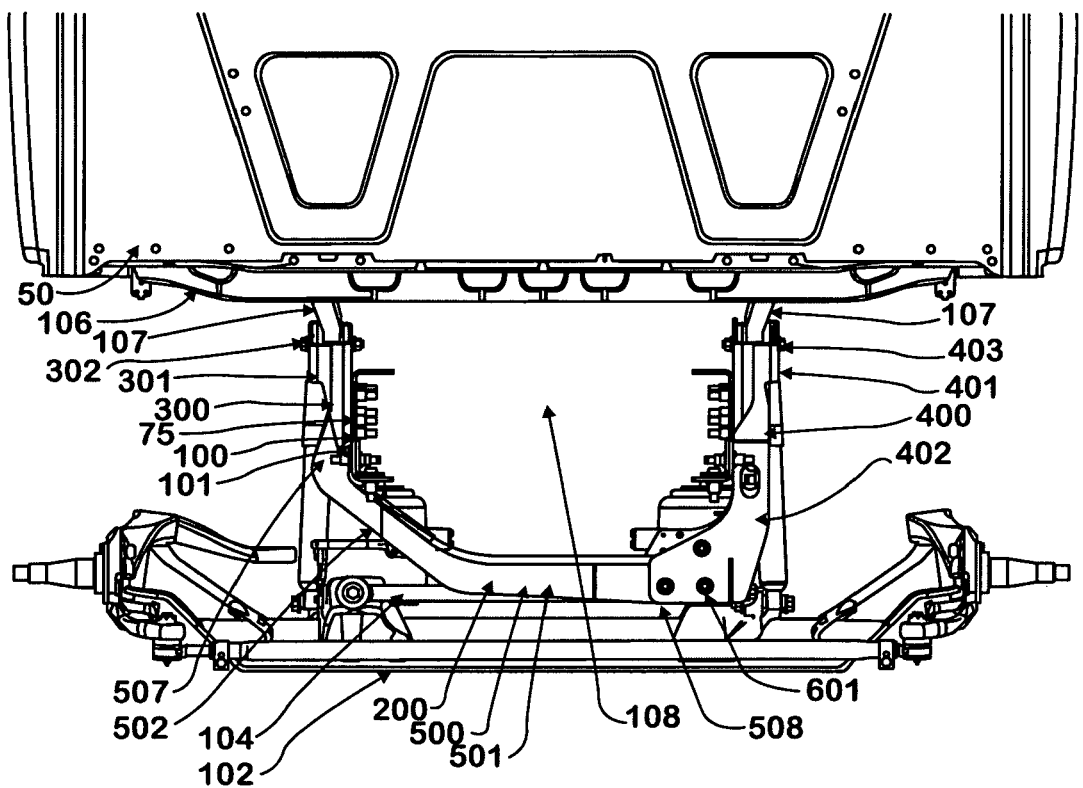
FIG. 4—A rear view of an embodiment of the invention.

FIG. 4 again shows a vehicle 50 having a chassis 75 with ladder-type vehicle frame 100 with frame side-members 101, as well as an axle 102, a suspension 103 (only partially visible) with a Panhard rod 104, a cab 106 supported by cab mounts 107, and an embodiment of the belly-band crossmember assembly 200. The belly-band crossmember assembly 200 is again provided with a first end subassembly 300 having a first end subassembly upwards extending section 301 that terminates in a first end subassembly cab mounting point 302, a second end subassembly 400 having a second end subassembly downwards extending section 402 and a second end subassembly upwards extending section 401 that terminates in a second end subassembly cab mounting point 403, and a center subassembly 500 having a center subassembly horizontal section 501 and a center subassembly upwards extending section 502. The first end subassembly cab mounting point 302 and second end subassembly cab mounting point 403 provide support for the cab 106 through cab mounts 107. The center subassembly 500 engages the first end subassembly 300 at the point of engagement 507 and engages the second end subassembly 400 at the point of engagement 508. FIG. 4 again illustrates the space for the vehicle powertrain 108, which the belly-band crossmember assembly 200 is made to accommodate.

Figure 5:
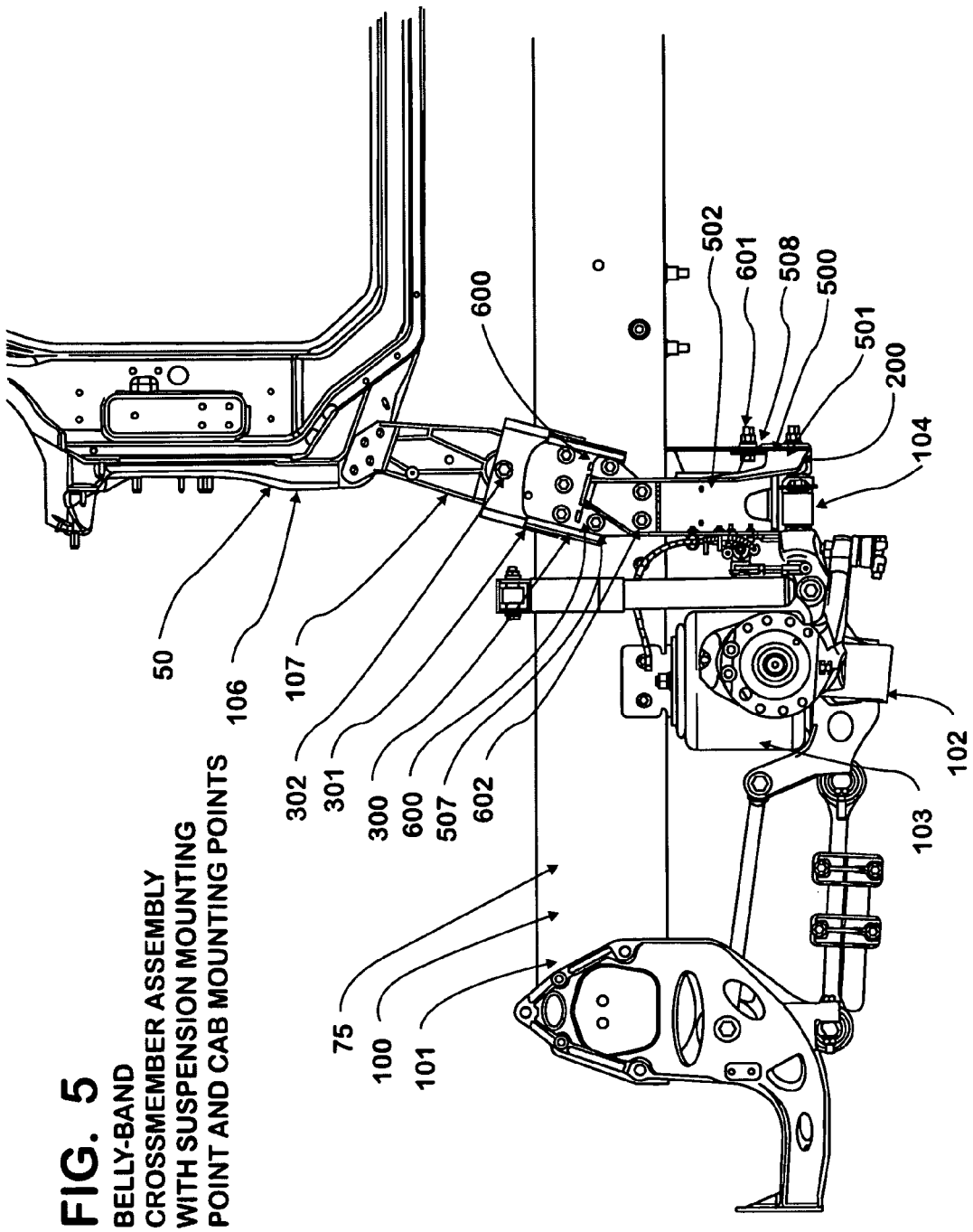
FIG. 5—A left view of an embodiment of the invention.

FIG. 5 again shows a vehicle 50 having a chassis 75 with ladder-type vehicle frame 100 with frame side-members 101, as well as an axle 102, a suspension 103 with a Panhard rod 104, a cab 106 supported by cab mounts 107, and an embodiment of the belly-band crossmember assembly 200. The belly-band crossmember assembly 200 is again provided with a first end subassembly 300 having a first end subassembly upwards extending section 301 that terminates in a first end subassembly cab mounting point 302, a second end subassembly 400 (only partially visible) having a second end subassembly upwards extending section 401 (not visible) that terminates in a second end subassembly cab mounting point 403 (not visible), and a center subassembly 500 having a center subassembly horizontal section 501 and a center subassembly upwards extending section 502. The first end subassembly cab mounting point 302 and second end subassembly cab mounting point 403 (not visible) provide support for the cab 106 through cab mounts 107. The center subassembly 500 engages the first end subassembly 300 at the point of engagement 507 and engages the second end subassembly 400 at the point of engagement 508. Prior to installation, the center subassembly 500 is attached to the first end subassembly 300 by frangible tack-welds 600, and the center subassembly 500 is attached to the second end subassembly 400 (only partially visible) by pre-installed fasteners 601. The belly-band crossmember assembly 200 is attached to the ladder-type vehicle frame 100 using belly-band crossmember assembly frame mounting fasteners 602.

Figure 6:
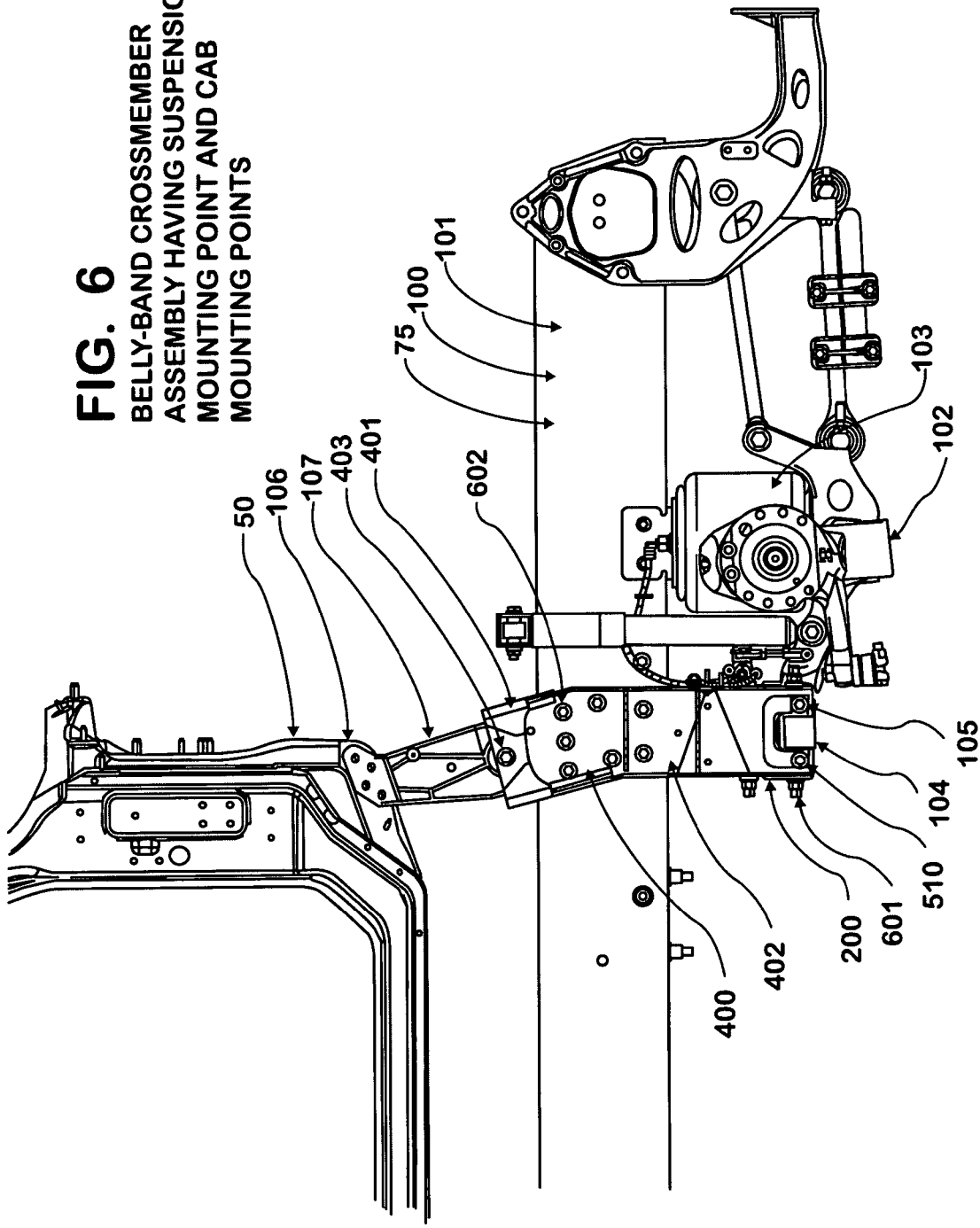
FIG. 6—A right view of an embodiment of the invention.

FIG. 6 again shows a vehicle 50 having a chassis 75 with ladder-type vehicle frame 100 with frame side-members 101, as well as an axle 102, a suspension 103 with a Panhard rod 104, a cab 106 supported by cab mounts 107, and an embodiment of the belly-band crossmember assembly 200. The belly-band crossmember assembly 200 is again provided with a first end subassembly 300 (not visible) having a first end subassembly upwards extending section 301 (not visible) that terminates in a first end subassembly cab mounting point 302 (not visible), a second end subassembly 400 having a second end subassembly downwards extending section 402 and a second end subassembly upwards extending section 401 that terminates in a second end subassembly cab mounting point 403, and a center subassembly 500 (not visible) having a center subassembly horizontal section 501 (not visible) and a center subassembly upwards extending section 502 (not visible). The first end subassembly cab mounting point 302 (not visible) and second end subassembly cab mounting point 403 provide support for the cab 106 through cab mounts 107. The center subassembly 500 (not visible) is provided with a suspension mounting point 510, to which the Panhard rod 104 of the suspension 103 is attached using Panhard rod mounting bolts 105. Prior to installation, the center subassembly 500 (not visible) is attached to the first end subassembly 300 (not visible) by frangible tack-welds 600 (not visible), and the center subassembly 500 (not visible) is attached to the second end subassembly 400 by pre-installed fasteners 601. The belly-band crossmember assembly 200 is attached to the ladder-type vehicle frame 100 using belly-band crossmember assembly frame mounting fasteners 602.

Figure 7:
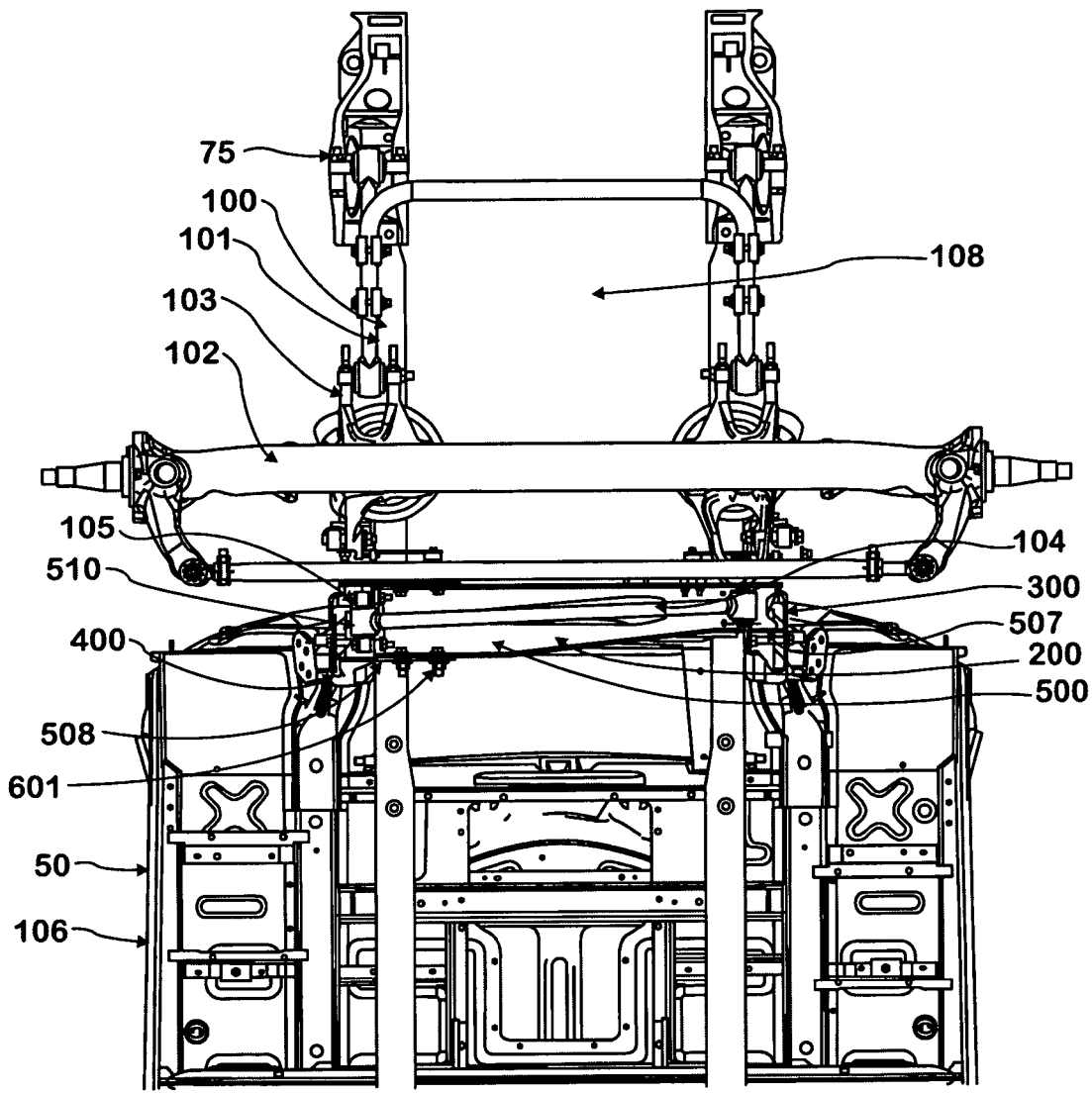
FIG. 7—A bottom view of an embodiment of the invention.

FIG. 7 again shows a vehicle 50 having a chassis 75 with ladder-type vehicle frame 100 with frame side-members 101, as well as an axle 102, a suspension 103 with a Panhard rod 104, a cab 106 supported by cab mounts 107 (not visible), and an embodiment of the belly-band crossmember assembly 200. The belly-band crossmember assembly 200 is again provided with a first end subassembly 300, a second end subassembly 400, and a center subassembly 500. The center subassembly 500 engages the first end subassembly 300 at the point of engagement 507 and engages the second end subassembly 400 at the point of engagement 508. The center subassembly 500 is provided with a suspension mounting point 510, to which the Panhard rod 104 of the suspension 103 is attached using Panhard rod mounting bolts 105. Prior to installation, the center subassembly 500 is attached to the first end subassembly 300 by frangible tack-welds 600 (not visible), and the center subassembly 500 is attached to the second end subassembly 400 by pre-installed fasteners 601. FIG. 7 again illustrates the space for the vehicle powertrain 108, which the belly-band crossmember assembly 200 is made to accommodate.

Figure 8:
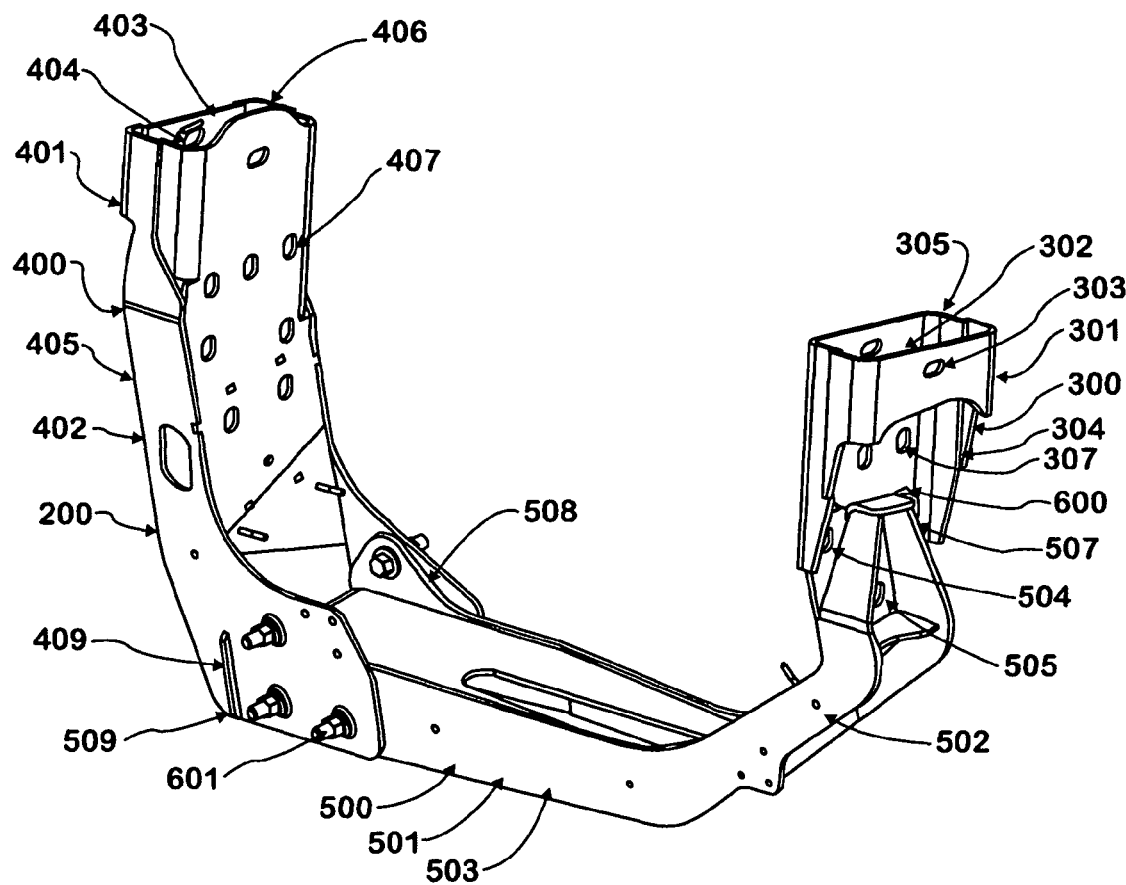
FIG. 8—A left hand isometric view of an embodiment of the invention.

FIG. 8 shows a belly-band crossmember assembly 200 having a first end subassembly 300, a center subassembly 500, and a second end subassembly 400. The first end subassembly 300 has a first end subassembly upwards extending section 301 terminating in a first end subassembly cab mounting point 302 having first end subassembly cab mounting holes 303. The first end subassembly 300 also has first end subassembly non-overlapping frame mounting holes 307 and first end subassembly overlapping frame mounting holes 306 (not visible). The second end subassembly 400 has a second end subassembly downwards extending section 402 and a second end subassembly upwards extending section 401 terminating in a second end subassembly cab mounting point 403 having second end subassembly cab mounting holes 404. The second end subassembly 400 is further provided with second end subassembly frame mounting holes 407. The center subassembly 500 has a center subassembly generally horizontal section 501 and a center subassembly generally upwards extending section 502, and engages with the first end subassembly 300 at the point of engagement 507 and with the second end subassembly 400 at the point of engagement 508. The center subassembly 500 also has center subassembly non-overlapping frame mounting holes 505 and center subassembly overlapping frame mounting holes 504. The center subassembly overlapping frame mounting holes 504 overlap the first end subassembly overlapping frame mounting holes 306 (not visible). The first end subassembly 300 has a generally C shaped cross-section 304, except near the first end subassembly cab mounting point 302, where it has a closed section 305. Similarly, the second end subassembly 400 has a generally C shaped cross-section 405, except near the second end subassembly cab mounting point 403, where it has a closed section 406. The center subassembly 500 has a generally C shaped cross section 503. The center subassembly 500 is attached to the first end subassembly 300 by frangible tack-welds 600, and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200.

Figure 9:
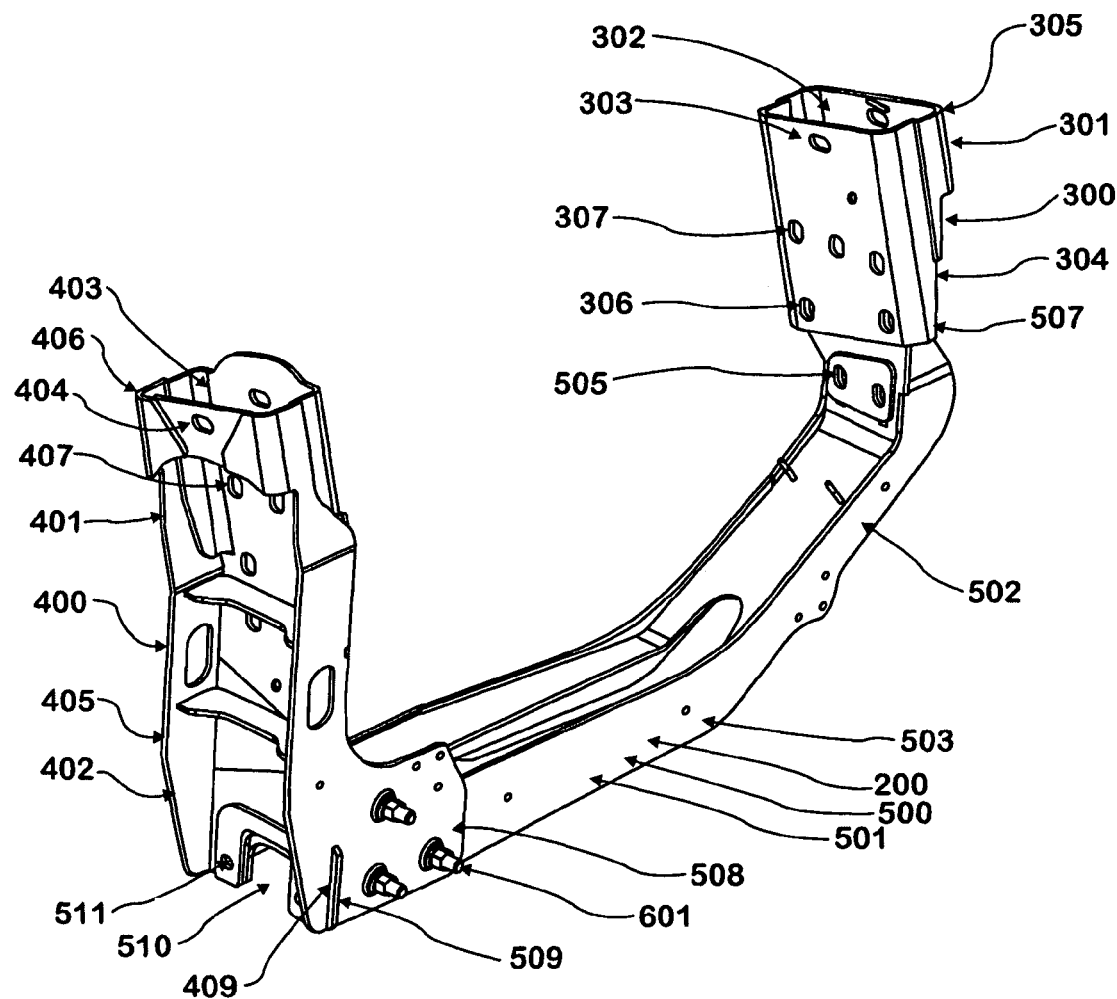
FIG. 9—A right hand isometric view of an embodiment of the invention.

FIG. 9 again shows a belly-band crossmember assembly 200 having a first end subassembly 300 with a first end subassembly upwards extending section 301 terminating in a first end subassembly cab mounting point 302 having first end subassembly cab mounting holes 303, a center subassembly 500 with a center subassembly generally horizontal section 501 and a center subassembly generally upwards extending section 502, and a second end subassembly 400 with a second end subassembly downwards extending section 402 and a second end subassembly upwards extending section 401 terminating in a second end subassembly cab mounting point 403 having second end subassembly cab mounting holes 404. The center subassembly 500 again engages with the first end subassembly 300 at the point of engagement 507 and with the second end subassembly 400 at the point of engagement 508. The first end subassembly 300 has first end subassembly non-overlapping frame mounting holes 307 and first end subassembly overlapping frame mounting holes 306. The center subassembly 500 has center subassembly non-overlapping frame mounting holes 505 and center subassembly overlapping frame mounting holes 504 (not visible). The center subassembly overlapping frame mounting holes 504 (not visible) overlap the first end subassembly overlapping frame mounting holes 306. The second end subassembly 400 is also provided with second end subassembly frame mounting holes 407. The first end subassembly 300 again has a generally C shaped cross-section 304, except near the first end subassembly cab mounting point 302, where it has a closed section 305. The second end subassembly 400 again has a generally C shaped cross-section 405, except near the second end subassembly cab mounting point 403, where it has a closed section 406. The center subassembly 500 again has a generally C shaped cross section 503. The center subassembly 500 is attached to the first end subassembly 300 by frangible tack-welds 600 (not visible), and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200. The center subassembly 500 is further provided with a suspension mounting point 510 having suspension mounting holes 511.

Figure 10:
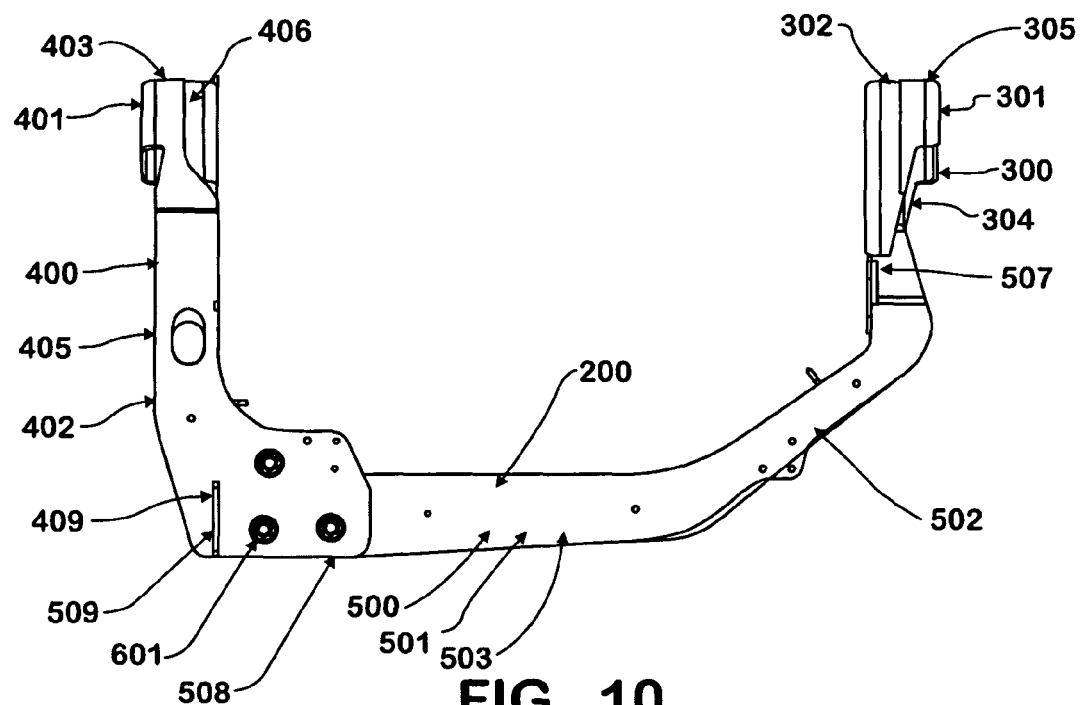
FIG. 10—A front view of an embodiment of the invention.

FIG. 10 shows a belly-band crossmember assembly 200 having a first end subassembly 300 with a first end subassembly upwards extending section 301 terminating in a first end subassembly cab mounting point 302 having first end subassembly cab mounting holes 303 (not visible), a center subassembly 500 with a center subassembly generally horizontal section 501 and a center subassembly generally upwards extending section 502, and a second end subassembly 400 with a second end subassembly downwards extending section 402 and a second end subassembly upwards extending section 401 terminating in a second end subassembly cab mounting point 403 having second end subassembly cab mounting holes 404 (not visible). The center subassembly 500 again engages with the first end subassembly 300 at the point of engagement 507 and with the second end subassembly 400 at the point of engagement 508. The first end subassembly 300 again has a generally C shaped cross-section 304, except near the first end subassembly cab mounting point 302, where it has a closed section 305. The second end subassembly 400 again has a generally C shaped cross-section 405, except near the second end subassembly cab mounting point 403, where it has a closed section 406. The center subassembly 500 again has a generally C shaped cross section 503. The center subassembly 500 is attached to the first end subassembly 300 by frangible tack-welds 600 (not visible), and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200.

Figure 11:
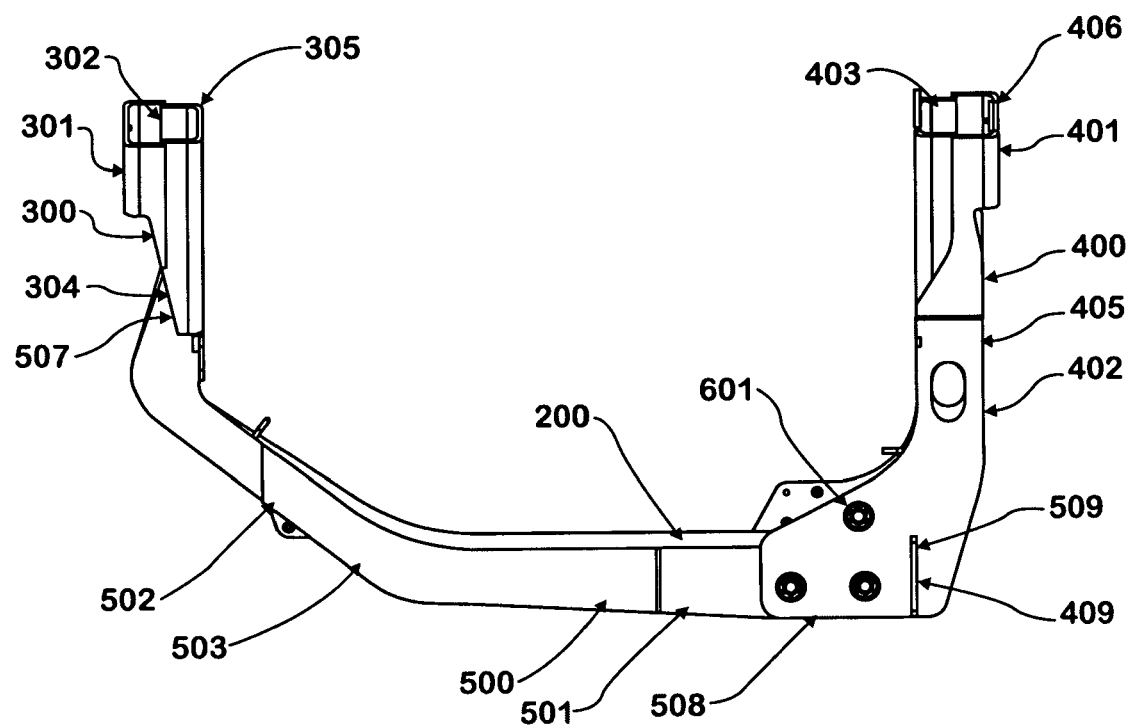
FIG. 11—A rear view of an embodiment of the invention.

FIG. 11 shows a belly-band crossmember assembly 200 having a first end subassembly 300 with a first end subassembly upwards extending section 301 terminating in a first end subassembly cab mounting point 302 having first end subassembly cab mounting holes 303 (not visible), a center subassembly 500 with a center subassembly generally horizontal section 501 and a center subassembly generally upwards extending section 502, and a second end subassembly 400 with a second end subassembly downwards extending section 402 and a second end subassembly upwards extending section 401 terminating in a second end subassembly cab mounting point 403 having second end subassembly cab mounting holes 404 (not visible). The center subassembly 500 again engages with the first end subassembly 300 at the point of engagement 507 and with the second end subassembly 400 at the point of engagement 508. The first end subassembly 300 again has a generally C shaped cross-section 304, except near the first end subassembly cab mounting point 302, where it has a closed section 305. The second end subassembly 400 again has a generally C shaped cross-section 405, except near the second end subassembly cab mounting point 403, where it has a closed section 406. The center subassembly 500 again has a generally C shaped cross section 503. The center subassembly 500 is attached to the first end subassembly 300 by frangible tack-welds 600 (not visible), and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200.

Figure 12:
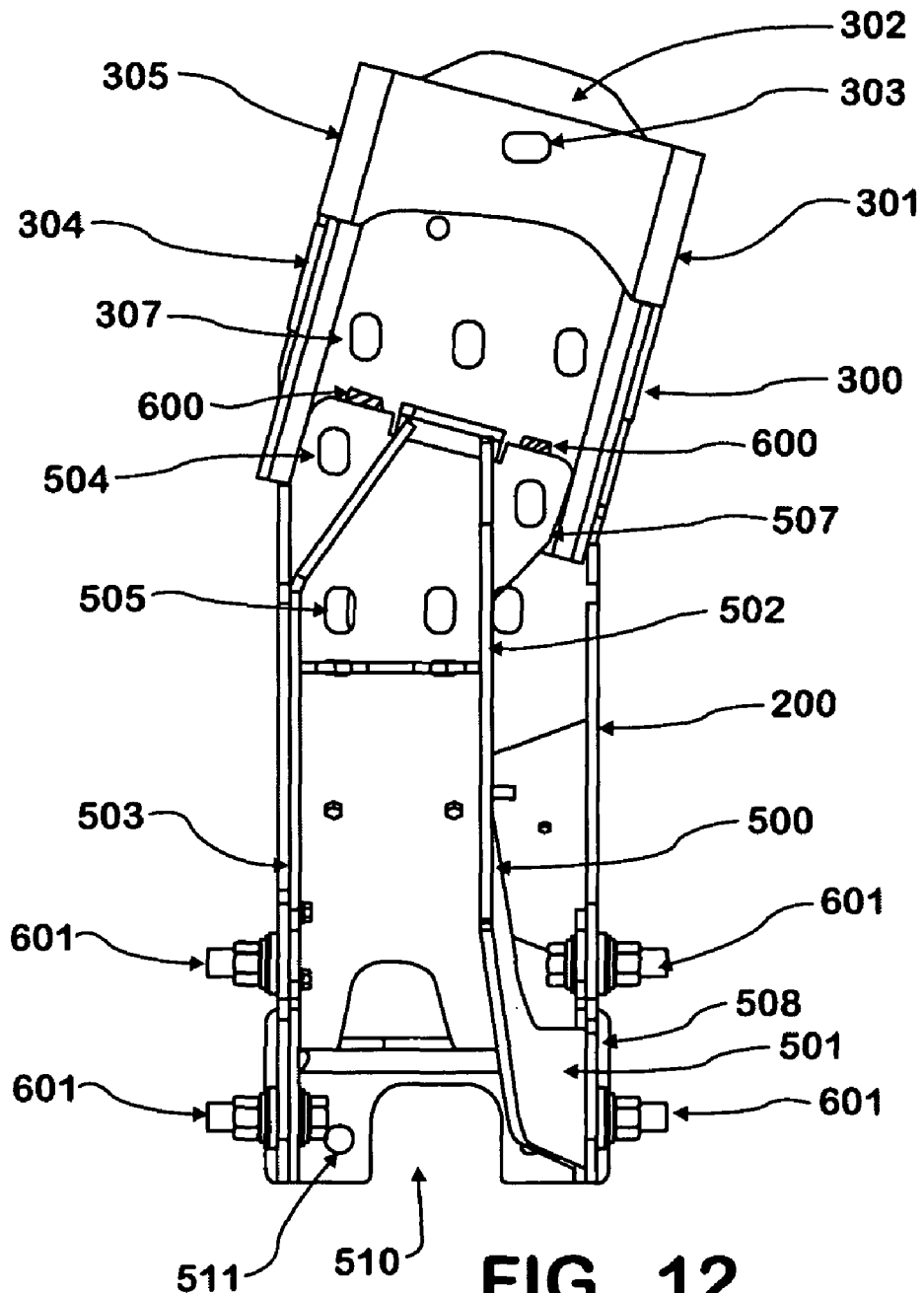
FIG. 12—A left view of an embodiment of the invention.

FIG. 12 shows a belly-band crossmember assembly 200 having a first end subassembly 300 with a first end subassembly upwards extending section 301 terminating in a first end subassembly cab mounting point 302 having first end subassembly cab mounting holes 303, a center subassembly 500 with a center subassembly generally horizontal section 501 and a center subassembly generally upwards extending section 502, and a second end subassembly 400 (only partially visible). The center subassembly 500 again engages with the first end subassembly 300 at the point of engagement 507 and with the second end subassembly 400 at the point of engagement 508. The first end subassembly 300 has first end subassembly non-overlapping frame mounting holes 307 and first end subassembly overlapping frame mounting holes 306 (not visible). The center subassembly 500 has center subassembly non-overlapping frame mounting holes 505 and center subassembly overlapping frame mounting holes 504. The center subassembly overlapping frame mounting holes 504 overlap the first end subassembly overlapping frame mounting holes 306. The first end subassembly 300 again has a generally C shaped cross-section 304, except near the first end subassembly cab mounting point 302, where it has a closed section 305. The second end subassembly 500 again has a generally C shaped cross section 503. The center subassembly 500 is attached to the first end subassembly 300 by frangible tack-welds 600, and the center subassembly 500 is attached to the second end subassembly 400 by pre-installed fasteners 601. The center subassembly 500 is further provided with a suspension mounting point 510 having suspension mounting holes 511.

Figure 13:
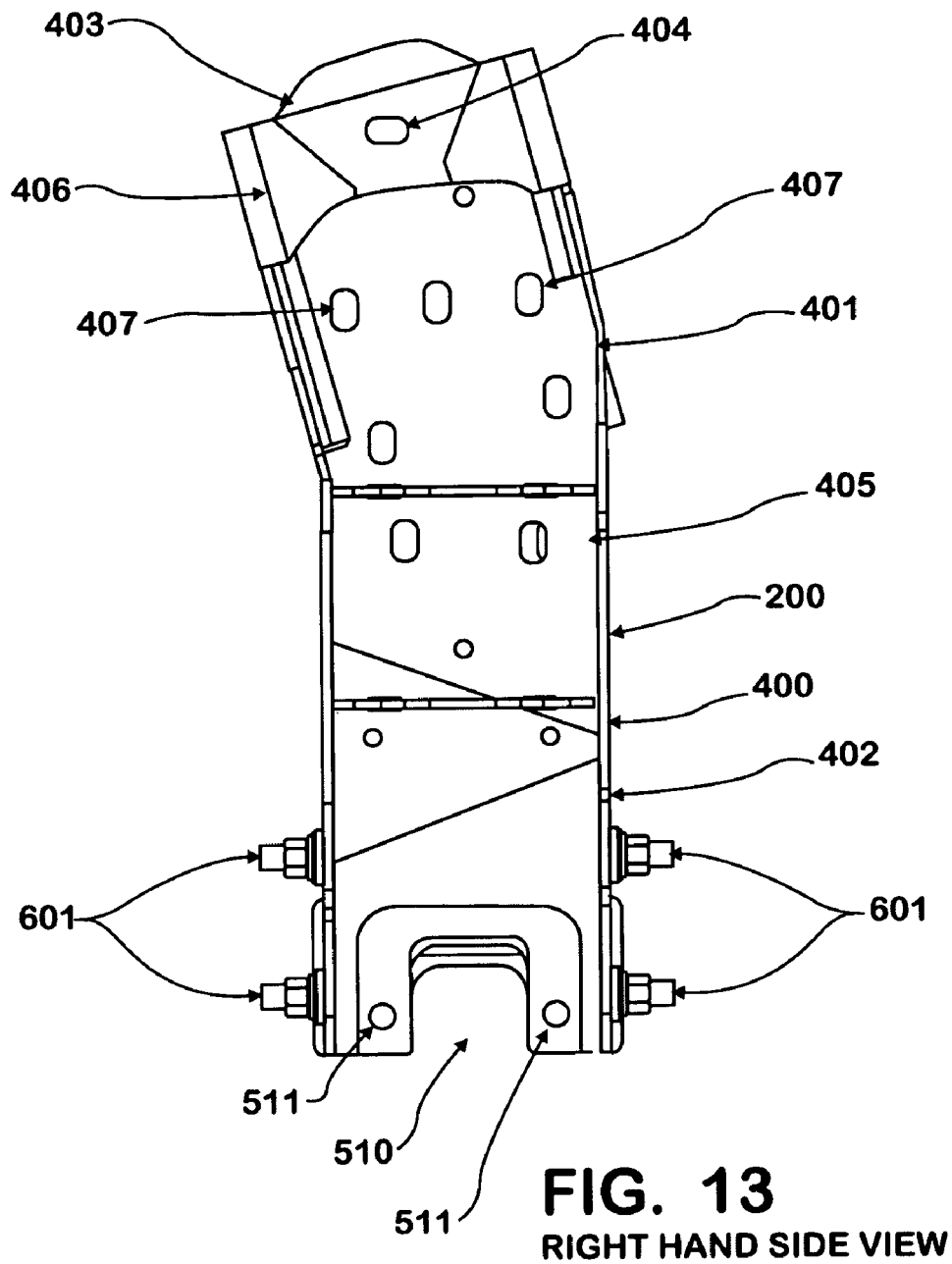
FIG. 13—A right view of an embodiment of the invention.

FIG. 13 shows a belly-band crossmember assembly 200 having a first end subassembly 300 (not visible), a center subassembly 500 (not visible), and a second end subassembly 400 with a second end subassembly downwards extending section 402 and a second end subassembly upwards extending section 401 terminating in a second end subassembly cab mounting point 403 having second end subassembly cab mounting holes 404. The second end subassembly 400 is further provided with second end subassembly frame mounting holes 407. The second end subassembly 400 again has a generally C shaped cross-section 405, except near the second end subassembly cab mounting point 403, where it has a closed section 406. The center subassembly 500 (not visible) is attached to the first end subassembly 300 (not visible) by frangible tack-welds 600 (not visible), and the center subassembly 500 (not visible) is attached to the second end subassembly 400 by pre-installed fasteners 601. The center subassembly 500 is further provided with a suspension mounting point 510 having suspension mounting holes 511.

Figure 14:
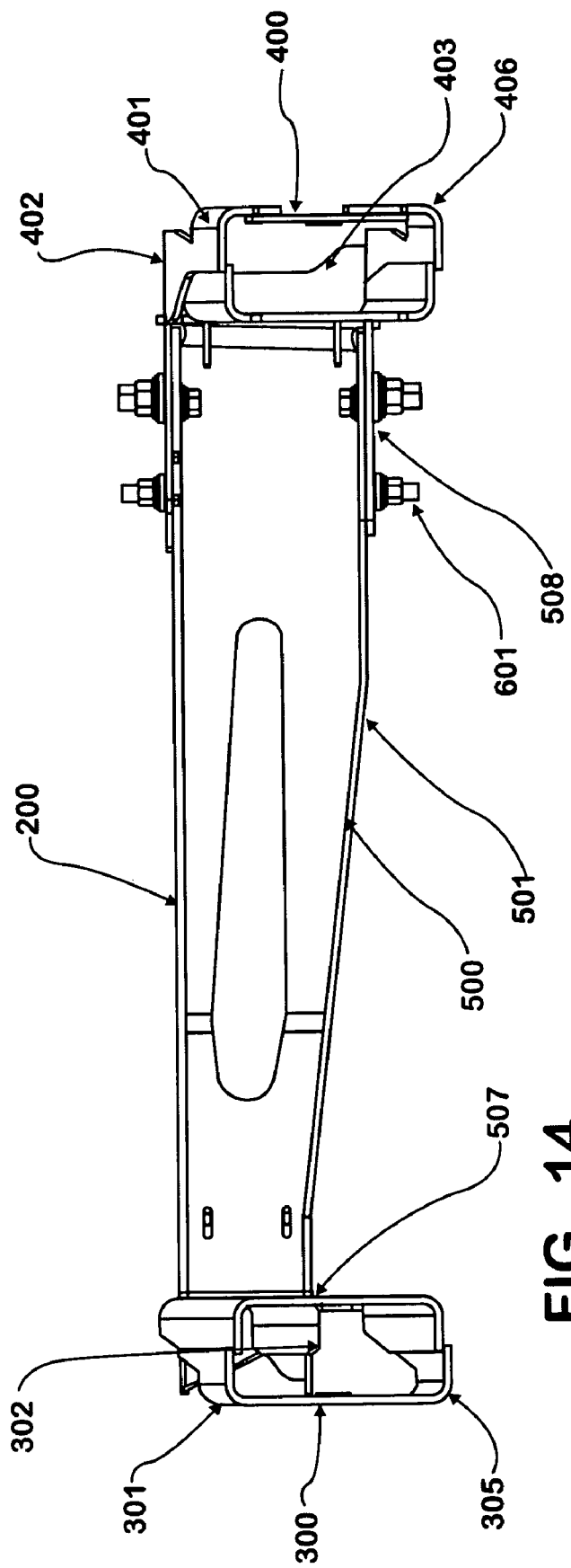
FIG. 14—A top view of an embodiment of the invention.

FIG. 14 shows a belly-band crossmember assembly 200 having a first end subassembly 300 with a first end subassembly upwards extending section 301 terminating in a first end subassembly cab mounting point 302 having first end subassembly cab mounting holes 303 (not visible), a center subassembly 500 with a center subassembly generally horizontal section 501 and a center subassembly generally upwards extending section 502 (not visible), and a second end subassembly 400 with a second end subassembly downwards extending section 402 and a second end subassembly upwards extending section 401 terminating in a second end subassembly cab mounting point 403 having second end subassembly cab mounting holes 404 (not visible). The center subassembly 500 again engages with the first end subassembly 300 at the point of engagement 507 and with the second end subassembly 400 at the point of engagement 508. The first end subassembly 300 again has a generally C shaped cross-section 304 (not visible), except near the first end subassembly cab mounting point 302, where it has a closed section 305. The second end subassembly 400 again has a generally C shaped cross-section 405 (not visible), except near the second end subassembly cab mounting point 403, where it has a closed section 406. The center subassembly 500 again has a generally C shaped cross section 503 (not visible). The center subassembly 500 is attached to the first end subassembly 300 by frangible tack-welds 600 (not visible), and the center subassembly 500 is attached to the second end subassembly 400 by pre-installed fasteners 601.

Figure 15:
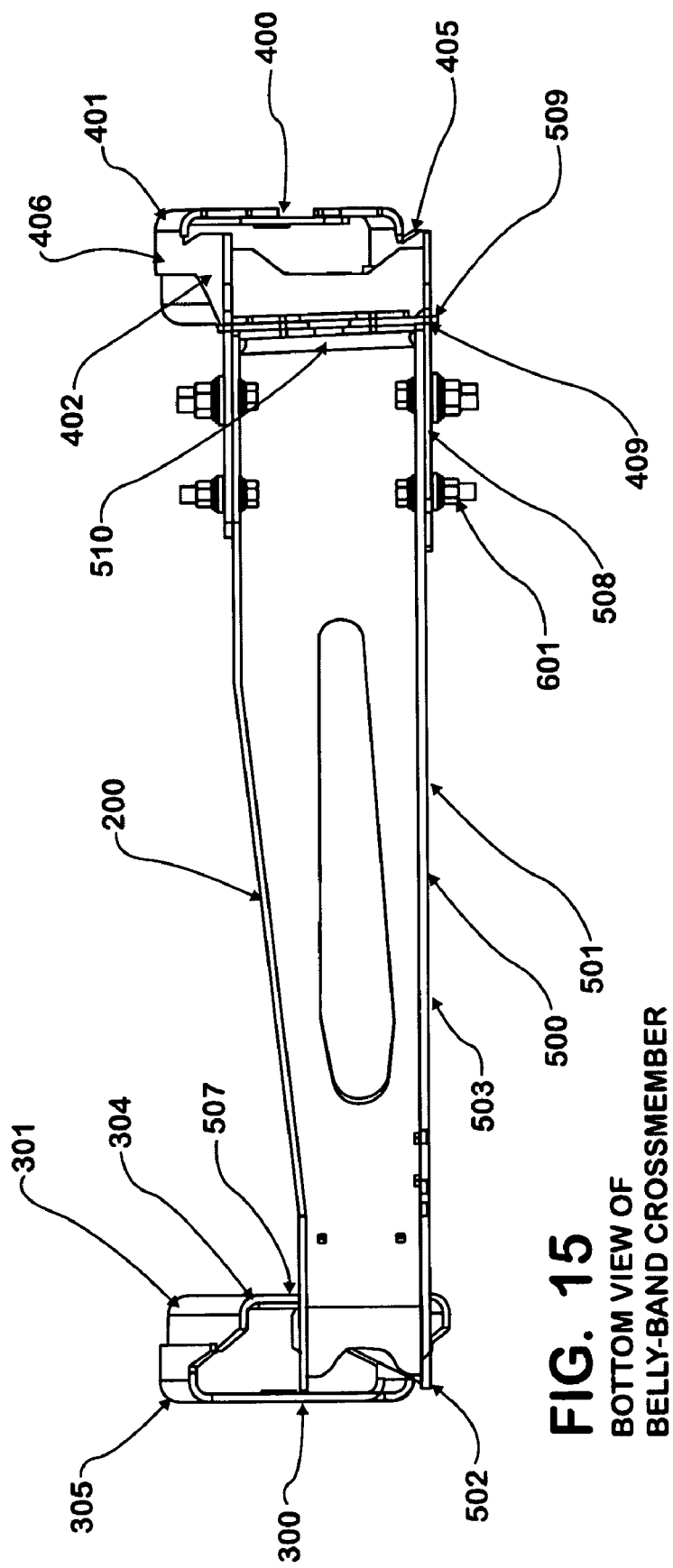
FIG. 15—A bottom view of an embodiment of the invention.

FIG. 15 shows a belly-band crossmember assembly 200 having a first end subassembly 300 with a first end subassembly upwards extending section 301 terminating in a first end subassembly cab mounting point 302 (not visible) having first end subassembly cab mounting holes 303 (not visible), a center subassembly 500 with a center subassembly generally horizontal section 501 and a center subassembly generally upwards extending section 502, and a second end subassembly 400 with a second end subassembly downwards extending section 402 and a second end subassembly upwards extending section 401 terminating in a second end subassembly cab mounting point 403 (not visible) having second end subassembly cab mounting holes 404 (not visible). The center subassembly 500 again engages with the first end subassembly 300 at the point of engagement 507 and with the second end subassembly 400 at the point of engagement 508. The first end subassembly 300 again has a generally C shaped cross-section 304, except near the first end subassembly cab mounting point 302, where it has a closed section 305. The second end subassembly 400 again has a generally C shaped cross-section 405, except near the second end subassembly cab mounting point 403, where it has a closed section 406. The center subassembly 500 again has a generally C shaped cross section 503. The center subassembly 500 is attached to the first end subassembly 300 by frangible tack-welds 600 (not visible), and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200. The center subassembly 500 is further provided with a suspension mounting point 510 having suspension mounting holes 511 (not visible).

Figure 16:
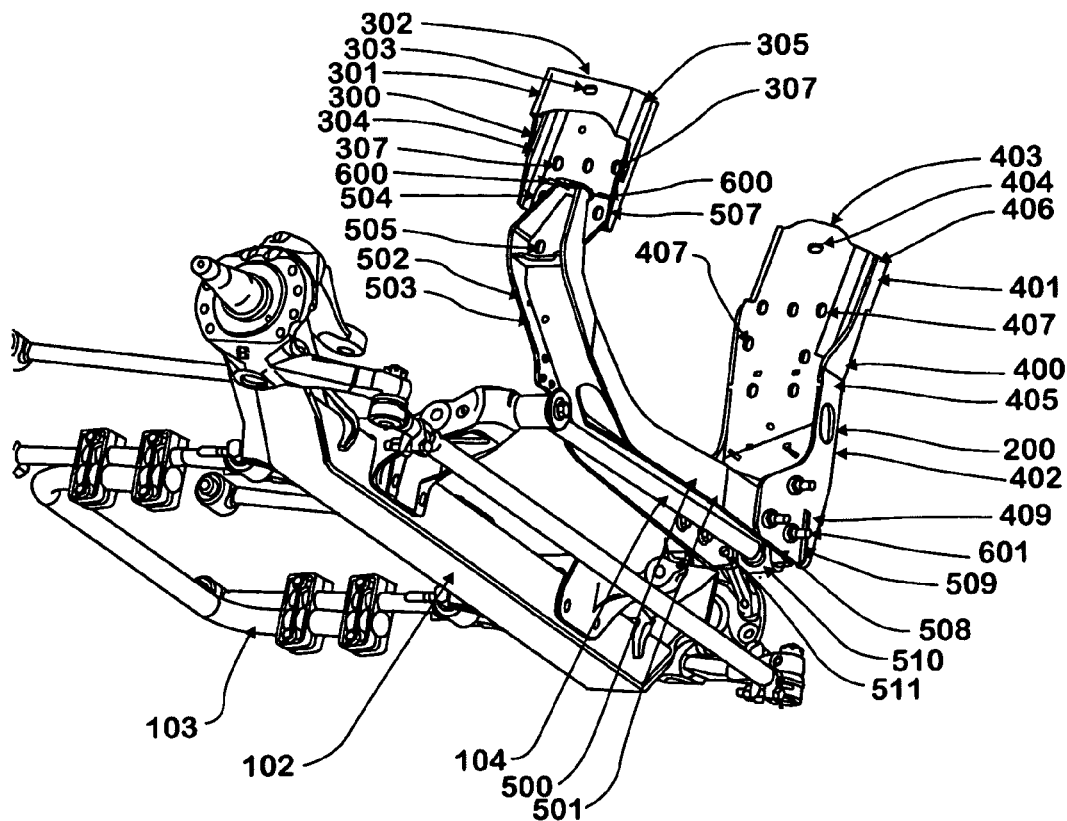
FIG. 16—A left hand lower isometric view of an embodiment of the invention.

FIG. 16 shows an axle 102, a suspension 103, and an embodiment of the instant invention, a belly-band crossmember assembly 200. The suspension 103 is provided with, among other links and control rods, a Panhard rod 104. The belly-band crossmember assembly 200 is provided with a first end subassembly 300, a second end subassembly 400, and a center subassembly 500. The first end subassembly 300 has a first end subassembly upwards extending section 301 that terminates in a first end subassembly cab mounting point 302 having first end subassembly cab mounting holes 303. The second end subassembly 400 has a second end subassembly downwards extending section 402 and a second end subassembly upwards extending section 401 that also terminates in a second end subassembly cab mounting point 403 having second end subassembly cab mounting holes 404. The center subassembly 500 has a center subassembly generally horizontal section 501 and a center subassembly generally upwards extending section 502, and engages with the first end subassembly 300 at the point of engagement 507 and with the second end subassembly 400 at the point of engagement 508. The first end subassembly 300 has first end subassembly non-overlapping frame mounting holes 307 and first end subassembly overlapping frame mounting holes 306 (not visible). The center subassembly 500 has center subassembly non-overlapping frame mounting holes 505 and center subassembly overlapping frame mounting holes 504. The center subassembly overlapping frame mounting holes 504 overlap the first end subassembly overlapping frame mounting holes 306 (not visible). The second end subassembly 400 is further provided with second end subassembly frame mounting holes 407. The first end subassembly 300 again has a generally C shaped cross-section 304, except near the first end subassembly cab mounting point 302, where it has a closed section 305. The second end subassembly 400 again has a generally C shaped cross-section 405, except near the second end subassembly cab mounting point 403, where it has a closed section 406. The center subassembly 500 again has a generally C shaped cross section 503. Prior to installation, the center subassembly 500 is attached to the first end subassembly 300 by frangible tack-welds 600, and the center subassembly 500 is attached to the second end subassembly 400 by pre-installed fasteners 601. The center subassembly 500 has a suspension mounting point 510 and suspension mounting holes 511, to which the Panhard rod 104 is attached using Panhard rod mounting bolts 105 (not shown). The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200.

Figure 17:
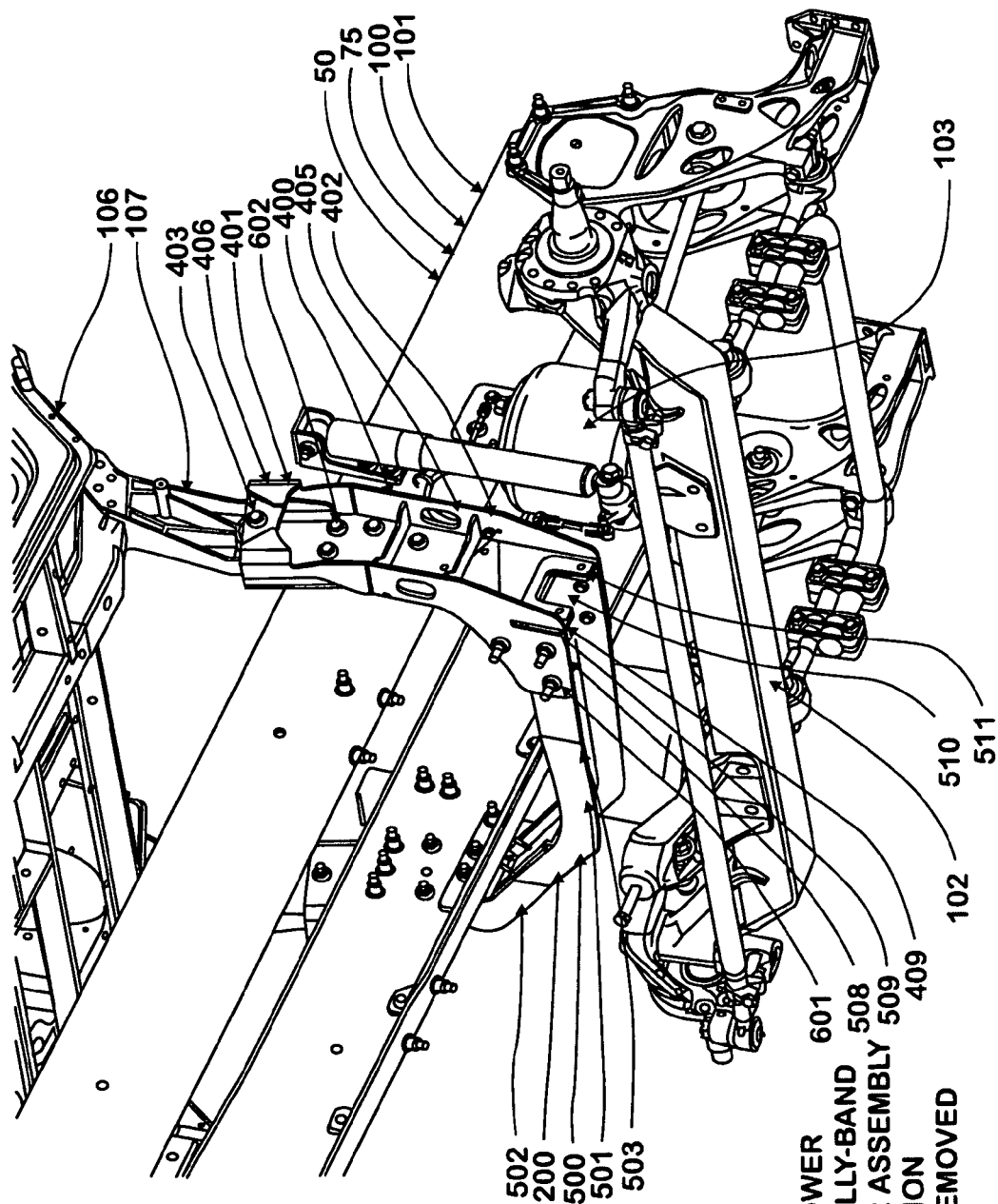
FIG. 17—A right hand lower isometric view of an embodiment of the invention.

FIG. 17 again shows a vehicle 50 having a chassis 75 with ladder-type vehicle frame 100 with frame side-members 101, as well as an axle 102, a suspension 103, a cab 106 supported by cab mounts 107, and an embodiment of the belly-band crossmember assembly 200. The belly-band crossmember assembly 200 is again provided with a first end subassembly 300 (not visible) having a first end subassembly upwards extending section 301 (not visible) that terminates in a first end subassembly cab mounting point 302 (not visible), a second end subassembly 400 having a second end subassembly downwards extending section 402 and a second end subassembly upwards extending section 401 that terminates in a second end subassembly cab mounting point 403, and a center subassembly 500 having a center subassembly horizontal section 501 and a center subassembly upwards extending section 502. The second end subassembly 400 has a generally C shaped cross-section 405, except near the second end subassembly cab mounting point 403, where it has a closed section 406. Similarly, the first end subassembly 300 (not visible) has a generally C shaped cross-section 304 (not visible), except near the first end subassembly cab mounting point 302 (not visible), where it has a closed section 305 (not visible). The center subassembly 500 has a generally C shaped cross section 503. The first end subassembly cab mounting point 302 (not visible) and second end subassembly cab mounting point 403 provide support for the cab 106 through cab mounts 107. The center subassembly 500 engages the first end subassembly 300 at the point of engagement 507 (not visible), and engages the second end subassembly 400 at the point of engagement 508. The center subassembly 500 is provided with a suspension mounting point 510 and suspension mounting holes 511, to which the Panhard rod 104 (not shown) of the suspension 103 would be attached using Panhard rod mounting bolts 105 (not shown). The Panhard rod 104 in FIG. 17 has been removed for clarity of illustration of the suspension mounting point 510 and point of engagement 508. Prior to installation, the center subassembly 500 is attached to the first end subassembly 300 (not visible) by frangible tack-welds 600 (not visible), and the center subassembly 500 is attached to the second end subassembly 400 by pre-installed fasteners 601. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200. The belly-band crossmember assembly 200 is attached to the ladder-type vehicle frame 100 using belly-band crossmember assembly frame mounting fasteners 602.

Figure 18:
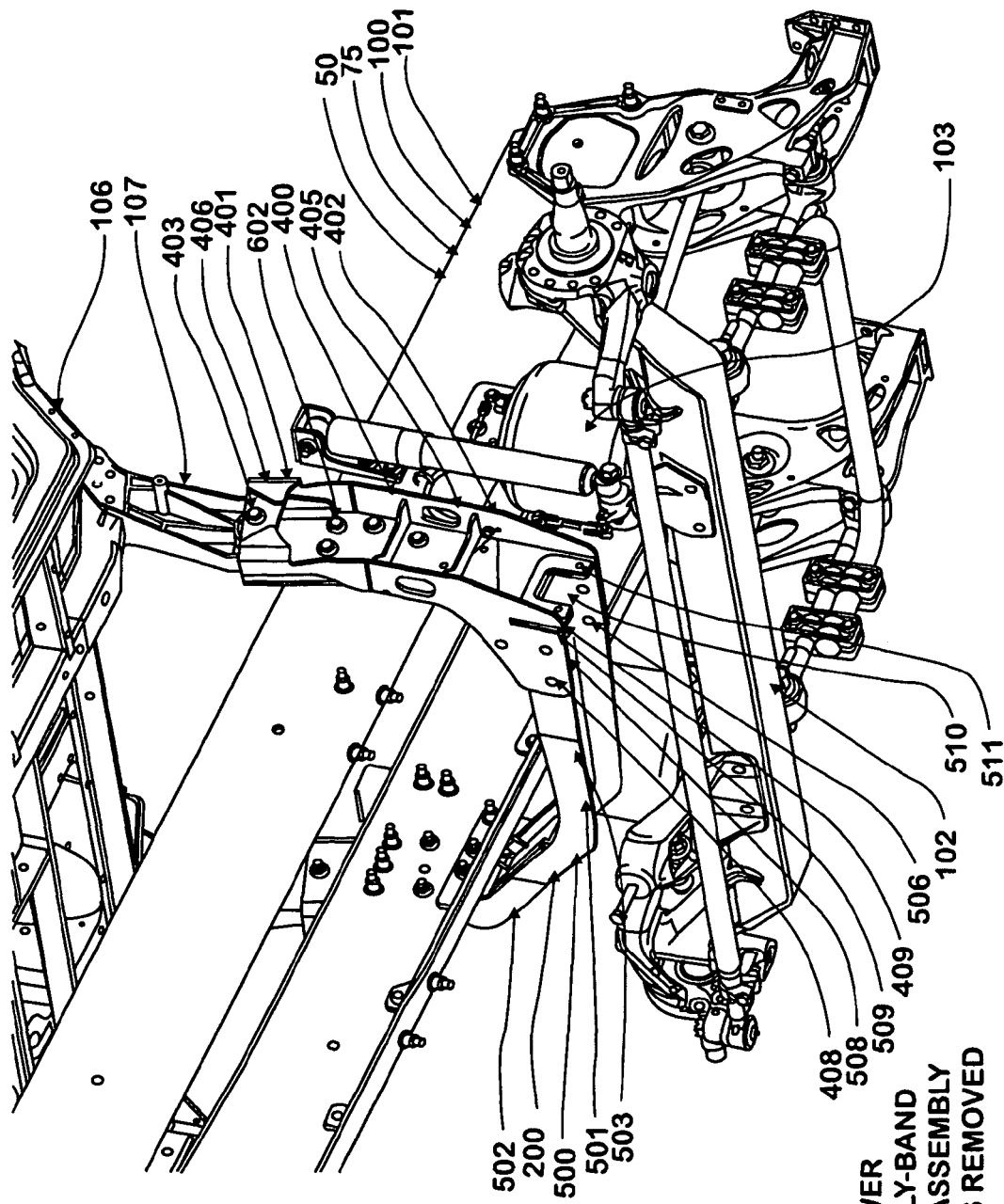
FIG. 18—A right hand lower isometric view of an embodiment of the invention.

FIG. 18 again shows a vehicle 50 having a chassis 75 with ladder-type vehicle frame 100 with frame side-members 101, as well as an axle 102, a suspension 103, a cab 106 supported by cab mounts 107, and an embodiment of the belly-band crossmember assembly 200. The belly-band crossmember assembly 200 is again provided with a first end subassembly 300 (not visible) having a first end subassembly upwards extending section 301 (not visible) that terminates in a first end subassembly cab mounting point 302 (not visible), a second end subassembly 400 having a second end subassembly downwards extending section 402 and a second end subassembly upwards extending section 401 that terminates in a second end subassembly cab mounting point 403, and a center subassembly 500 having a center subassembly horizontal section 501 and a center subassembly upwards extending section 502. The second end subassembly 400 has a generally C shaped cross-section 405, except near the second end subassembly cab mounting point 403, where it has a closed section 406. Similarly, the first end subassembly 300 (not visible) has a generally C shaped cross-section 304 (not visible), except near the first end subassembly cab mounting point 302 (not visible), where it has a closed section 305 (not visible). The center subassembly 500 has a generally C shaped cross section 503. The first end subassembly cab mounting point 302 (not visible) and second end subassembly cab mounting point 403 provide support for the cab 106 through cab mounts 107. The center subassembly 500 engages the first end subassembly 300 (not visible) at the point of engagement 507 (not visible), and engages the second end subassembly 400 at the point of engagement 508. The center subassembly 500 is provided with a suspension mounting point 510 and suspension mounting holes 511, to which the Panhard rod 104 (not shown) of the suspension 103 would be attached using Panhard rod mounting bolts 105 (not shown). The Panhard rod 104 in FIG. 17 has been removed for clarity of illustration of the suspension mounting point 510 and point of engagement 508. Prior to installation, the center subassembly 500 is attached to the first end subassembly 300 (not visible) by frangible tack-welds 600 (not visible), and the center subassembly 500 is attached to the second end subassembly 400 by pre-installed fasteners 601, which are not shown in FIG. 18, thereby showing the center subassembly pre-installed fastener holes 506 and second end subassembly pre-installed fastener holes 408. The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601, thereby increasing the overall strength of the belly-band crossmember assembly 200. The belly-band crossmember assembly 200 is attached to the ladder-type vehicle frame 100 using belly-band crossmember assembly frame mounting fasteners 602.

Figure 19:
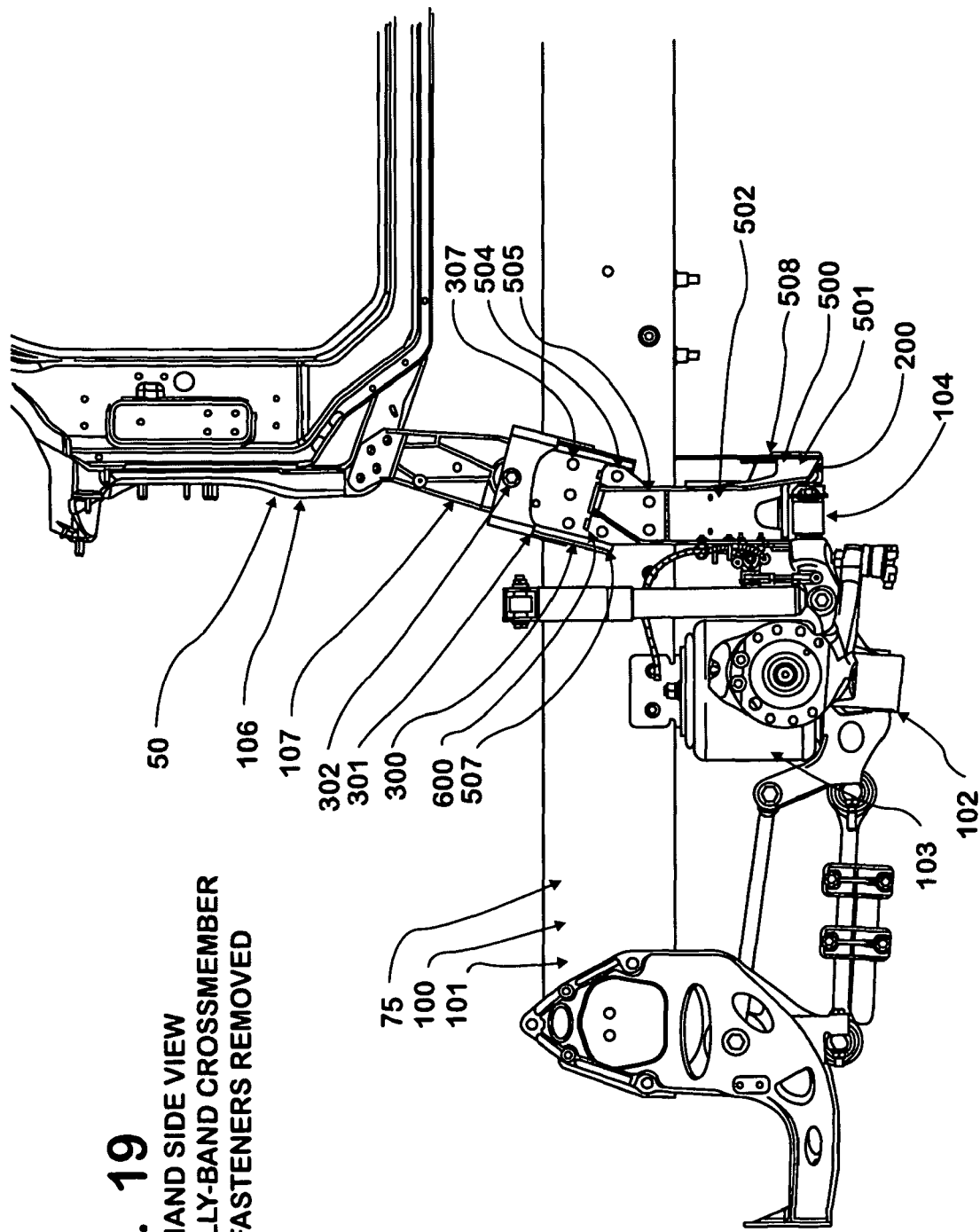
FIG. 19—A left view of an embodiment of the invention.

FIG. 19 again shows a vehicle 50 having a chassis 75 with ladder-type vehicle frame 100 with frame side-members 101, as well as an axle 102, a suspension 103 with a Panhard rod 104, a cab 106 supported by cab mounts 107, and an embodiment of the belly-band crossmember assembly 200. The belly-band crossmember assembly 200 is again provided with a first end subassembly 300 having a first end subassembly upwards extending section 301 that terminates in a first end subassembly cab mounting point 302, a second end subassembly 400 (only partially visible) having a second end subassembly upwards extending section 401 (not visible) that terminates in a second end subassembly cab mounting point 403 (not visible), and a center subassembly 500 having a center subassembly horizontal section 501 and a center subassembly upwards extending section 502. The first end subassembly cab mounting point 302 and second end subassembly cab mounting point 403 (not visible) provide support for the cab 106 through cab mounts 107. The center subassembly 500 engages the first end subassembly 300 at the point of engagement 507 and engages the second end subassembly 400 (only partially visible) at the point of engagement 508. The first end subassembly 300 has first end subassembly non-overlapping frame mounting holes 307 and first end subassembly overlapping frame mounting holes 306 (not visible). The center subassembly 500 has center subassembly non-overlapping frame mounting holes 505 and center subassembly overlapping frame mounting holes 504. The center subassembly overlapping frame mounting holes 504 overlap the first end subassembly overlapping frame mounting holes 306. Prior to installation, the center subassembly 500 is attached to the first end subassembly 300 by frangible tack-welds 600, and the center subassembly 500 is attached to the second end subassembly 400 by pre-installed fasteners 601 (not shown). Upon installation, the belly-band crossmember assembly frame mounting fasteners 602 are installed in the center subassembly non-overlapping frame mounting holes 505, center subassembly overlapping frame mounting holes 504 and first end subassembly overlapping frame mounting holes 306, and first end subassembly non-overlapping frame mounting holes 307, thereby rendering the tack-welds 600 redundant to the overall strength of the belly-band crossmember assembly 200.

Figure 20:
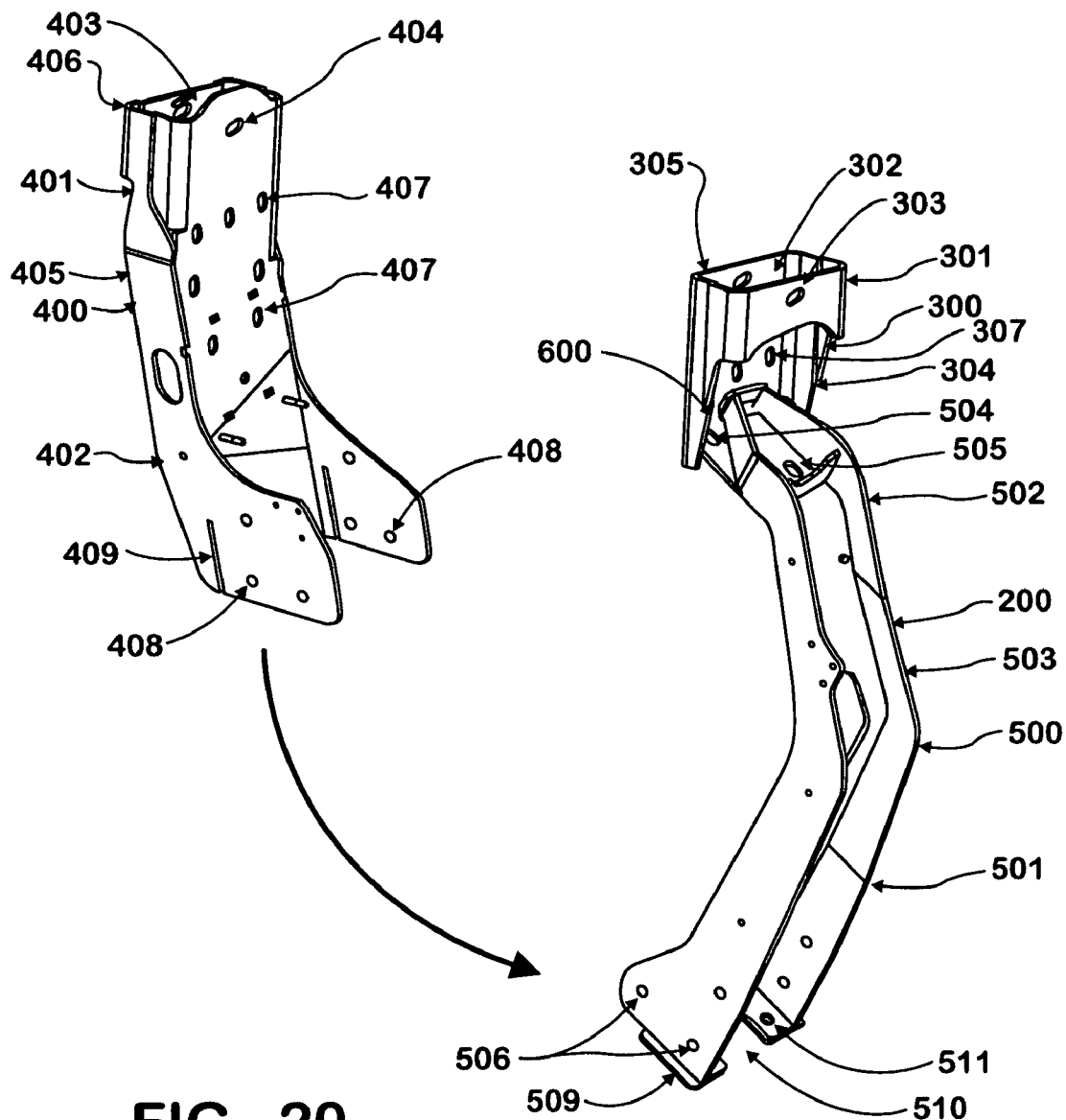
FIG. 20—A left hand isometric view of an embodiment of the invention.

FIG. 20 shows a belly-band crossmember assembly 200 having a first end subassembly 300, a center subassembly 500, and a second end subassembly 400. The first end subassembly 300 has a first end subassembly upwards extending section 301 terminating in a first end subassembly cab mounting point 302 having first end subassembly cab mounting holes 303. The first end subassembly 300 also has first end subassembly non-overlapping frame mounting holes 307 and first end subassembly overlapping frame mounting holes 306 (not visible). The second end subassembly 400 has a second end subassembly downwards extending section 402 and a second end subassembly upwards extending section 401 terminating in a second end subassembly cab mounting point 403 having second end subassembly cab mounting holes 404. The second end subassembly 400 is further provided with second end subassembly frame mounting holes 407. The center subassembly 500 has a center subassembly generally horizontal section 501 and a center subassembly generally upwards extending section 502. The center subassembly 500 also has center subassembly non-overlapping frame mounting holes 505 and center subassembly overlapping frame mounting holes 504. The center subassembly overlapping frame mounting holes 504 overlap the first end subassembly overlapping frame mounting holes 306 (not visible). The first end subassembly 300 has a generally C shaped cross-section 304, except near the first end subassembly cab mounting point 302, where it has a closed section 305. Similarly, the second end subassembly 400 has a generally C shaped cross-section 405, except near the second end subassembly cab mounting point 403, where it has a closed section 406. The center subassembly 500 has a generally C shaped cross section 503. The center subassembly 500 is attached to the first end subassembly 300 by frangible tack-welds 600, and the center subassembly 500 is attached to the second end subassembly 400 by pre-installed fasteners 601 (not shown). The center subassembly 500 is provided with tabs 509 and the second end subassembly 400 is provided with slots 409, into which slots 409 the tabs 509 fit. The tabs 509 and slots 409 serve to reinforce the point of engagement 508 and pre-installed fasteners 601 (not shown) that would be installed through the second end subassembly pre-installed fastener holes 408 and center subassembly pre-installed fastener holes 506, thereby increasing the overall strength of the belly-band crossmember assembly 200. The center subassembly 500 is further provided with a suspension mounting point 510 having suspension mounting holes 511. The center subassembly 500 is shown with the pre-installed fasteners 601 removed and in the process of being separated from the first end subassembly 300. This operation would occur with the belly-band crossmember assembly 200 attached to the frame 100

(not shown) of the vehicle 50 (not shown). All of the belly-band crossmember assembly frame mounting fasteners 602 (not shown) would remain installed in the second end subassembly frame mounting holes 407, thereby leaving the second end subassembly 400 attached to the frame 100 (not shown). The belly-band crossmember assembly frame mounting fasteners 602 (not shown) would be removed from the center subassembly overlapping frame mounting holes 504 and first end subassembly overlapping frame mounting holes 306, as well as from the center subassembly non-overlapping frame mounting holes 505, leaving the belly-band crossmember assembly frame mounting fasteners 602 (not shown) installed in the first end subassembly non-overlapping frame mounting holes 307. The pre-installed fasteners 601 (not shown) would then be removed, and the center subassembly 500 pulled down and away from the frame 100 of the vehicle 50. The center subassembly 500 would then be worked back and forth about the frangible tack-welds 600, until they failed, thereby releasing the center subassembly 500 from the belly-band crossmember assembly 200, and enabling access to vehicle components located within the space for the vehicle powertrain 108. It may be necessary to encourage the frangible tack-welds 600 to fail by grinding them partially away prior to removing the center subassembly 500. The center subassembly 500 may then be reinstalled using the frame mounting fasteners 602 (not shown) installed through the center subassembly overlapping frame mounting holes 504, first end subassembly overlapping frame mounting holes 306, and center subassembly non-overlapping frame mounting holes 505, and using the pre-installed fasteners 601 (not shown).

We claim:

1. A vehicle for operation on the ground, comprising:
a frame having frame side-members;
a belly-band crossmember assembly connecting said frame side-members;
said belly-band crossmember assembly having a first end subassembly, a second end subassembly, and a center subassembly;
said belly-band crossmember having frangible tack-welds attaching said first end subassembly to said center subassembly, and pre-installed bolts attaching said second end subassembly to said center subassembly;
wherein said center subassembly having at least one frame mounting hole overlapping at least one frame mounting hole in said first end subassembly; and
said first end subassembly having at least one non-overlapping frame mounting hole.

2. The vehicle for operation on the ground of claim 1, wherein:
said second end subassembly having a downwards extending section that engages said center subassembly; and
said center subassembly having a horizontal extending section and an upwards extending section that engages said first end subassembly.

3. The vehicle for operation on the ground of claim 1, wherein:
said center subassembly having at least one tab and said second end subassembly having at least one slot, said tab engaging said slot, said tab and said slot being oriented such that said tab may disengage from said slot upon removal of said pre-installed bolts attaching said second end subassembly to said center subassembly and rotation of said center subassembly about said frangible tack-welds.

4. The vehicle for operation on the ground of claim 1, wherein:
said first end subassembly and said second end subassembly being generally "C" shaped in cross-section and opening outwards from said frame side-members.

5. The vehicle for operation on the ground of claim 1, wherein:
said vehicle further having a cab supported by at least two cab mounts;
said first end subassembly extending upwards from one of said frame side-members to engage one of said at least two cab mounts; and
said second end subassembly extending upwards from another of said frame side-members to engage another of said at least two cab mounts.

6. The vehicle for operation on the ground of claim 5, wherein:
said first end subassembly being of a closed cross-section where it engages said one of said at least two cab mounts; and
said second end subassembly being of a closed cross-section where it engages said other of said at least two cab mounts.

7. The vehicle for operation on the ground of claim 1, wherein:
said center subassembly being generally "C" shaped in cross-section and opening downwards from said frame.

8. The vehicle for operation on the ground of claim 7, wherein:
said center subassembly being provided with a suspension component mounting point.

9. The vehicle for operation on the ground of claim 8, wherein:
said suspension component mounting point being positioned upon said center subassembly proximate to the point of attachment between said center subassembly and said second end subassembly, and within said "C" shaped cross-section.

10. The vehicle for operation on the ground of claim 8, wherein:
said suspension component mounting point further being a Panhard rod mounting point.

11. The vehicle for operation on the ground of claim 1, wherein:
said belly-band crossmember assembly being provided with at least one vehicle powertrain mounting point.

12. A belly-band crossmember assembly, comprising:
a first end subassembly, a second end subassembly, and a center subassembly;
frangible tack-welds attaching said first end subassembly to said center subassembly, and
pre-installed bolts attaching said second end subassembly to said center subassembly;
wherein said center subassembly having at least one frame mounting hole overlapping at least one frame mounting hole in said first end subassembly; and
said first end subassembly having at least one non-overlapping frame mounting hole.

13. The belly-band crossmember assembly of claim 12, wherein:
said second end subassembly having a downwards extending section that engages said center subassembly; and
said center subassembly having a horizontal extending section and an upwards extending section that engages said first end subassembly.

14. The belly-band crossmember assembly of claim 12, wherein:
said center subassembly having at least one tab and said second end subassembly having at least one slot, said tab engaging said slot, said tab and said slot being oriented such that said tab may disengage from said slot upon removal of said pre-installed bolts attaching said second end subassembly to said center subassembly and rotation of said center subassembly about said frangible tack-welds.

15. The belly-band crossmember assembly of claim 12, wherein:
said first end subassembly and said second end subassembly being generally "C" shaped in cross-section and opening outwards from said belly-band crossmember assembly.

16. The belly-band crossmember assembly of claim 12, wherein:
said first end subassembly extending upwards and being provided with a cab mounting point; and
said second end subassembly extending upwards and being provided with a cab mounting point.

17. The belly-band crossmember assembly of claim 16, wherein:
said first end subassembly being of a closed cross-section at its upwards extending end; and
said second end subassembly being of a closed cross-section at its upwards extending end.

18. The belly-band crossmember of claim 12, wherein:
said center subassembly being generally "C" shaped in cross-section and opening downwards.

19. The belly-band crossmember of claim 18, wherein:
said center subassembly being provided with a suspension component mounting point.

20. The belly-band crossmember of claim 19, wherein:
said suspension component mounting point being positioned upon said center subassembly proximate to the point of attachment between said center subassembly and said second end subassembly, and within said "C" shaped cross-section.

21. The belly-band crossmember of claim 19, wherein:
said suspension component mounting point further being a Panhard rod mounting point.

22. The belly-band crossmember of claim 12, wherein:
said belly-band crossmember assembly being provided with at least one vehicle powertrain mounting point.

* * * * *